(12) United States Patent
Oh

(10) Patent No.: US 9,049,601 B2
(45) Date of Patent: Jun. 2, 2015

(54) BASE STATION APPARATUS, MOBILE STATION APPARATUS, DISTRIBUTED ANTENNA WIRELESS COMMUNICATIONS SYSTEM, PILOT CHANNEL GENERATION METHOD, SYNCHRONIZATION CHANNEL GENERATION METHOD, AND ANTENNA SELECTION METHOD

(75) Inventor: Wahoh Oh, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 427 days.

(21) Appl. No.: 12/676,483

(22) PCT Filed: Sep. 1, 2008

(86) PCT No.: PCT/JP2008/065635
§ 371 (c)(1),
(2), (4) Date: Mar. 18, 2010

(87) PCT Pub. No.: WO2009/031485
PCT Pub. Date: Mar. 12, 2009

(65) Prior Publication Data
US 2010/0208656 A1 Aug. 19, 2010

(30) Foreign Application Priority Data

Sep. 4, 2007 (JP) .................................. 2007-228815

(51) Int. Cl.
*H04W 4/00* (2009.01)
*H04W 16/12* (2009.01)
(Continued)

(52) U.S. Cl.
CPC .............. *H04W 16/12* (2013.01); *H04J 13/004* (2013.01); *H04J 13/18* (2013.01); *H04W 88/085* (2013.01)

(58) Field of Classification Search
None
See application file for complete search history.

(56) References Cited

U.S. PATENT DOCUMENTS 5,809,395 A * 9/1998 Hamilton-Piercy et al. ... 370/489
6,717,930 B1 4/2004 Sezgin et al.
(Continued)

FOREIGN PATENT DOCUMENTS

CN 1901407 A 1/2007
CN 101632278 A 1/2010
(Continued)

OTHER PUBLICATIONS

Zhou et al. "Distributed Wireless Communication System: A New Architecture for Future Public Wireless Access", IEEE Communications Magazine 2003, 41 (Mar. 3) pp. 108-113.
(Continued)

*Primary Examiner* — Anh-Vu Ly
(74) *Attorney, Agent, or Firm* — Birch, Stewart, Kolasch & Birch, LLP

(57) ABSTRACT

The present invention is to provide base station apparatuses and mobile station apparatuses suitable for a configuration of a distributed wireless communications system, configure the distributed wireless communications system, and provide a pilot channel generation method and synchronization generation method suitable for the distributed wireless communications system. Provided are a control signal generating section 13 which generates a plurality of mutually different first pilot signals and a second pilot signal based on control data input from the core network apparatus CN constituting the distributed wireless communications system, combines the first pilot signals and the second pilot signal, and thereby generates specific pilot channels for each of radio access unit apparatuses, and a transmitting section 10 that transmits the specific pilot channels respectively to the radio access unit apparatuses.

10 Claims, 20 Drawing Sheets

RoF: Radio on Fiber
RAU: Radio Access Unit

(51) Int. Cl.
   *H04J 13/00* (2011.01)
   *H04J 13/18* (2011.01)
   *H04W 88/08* (2009.01)

(56) References Cited

U.S. PATENT DOCUMENTS

| | | |
|---|---|---|
| 6,947,402 B2 | 9/2005 | Sezgin et al. |
| 7,095,723 B2 | 8/2006 | Sezgin et al. |
| 7,102,994 B2 | 9/2006 | Sezgin et al. |
| 7,596,105 B2 | 9/2009 | Sezgin et al. |
| 7,664,504 B2 | 2/2010 | Bishop |
| 8,130,730 B2 | 3/2012 | Sezgin et al. |
| 8,391,915 B2 | 3/2013 | Bishop |
| 2002/0097705 A1 | 7/2002 | Sezgin et al. |
| 2002/0118705 A1 | 8/2002 | Sezgin et al. |
| 2004/0085920 A1 | 5/2004 | Sezgin et al. |
| 2004/0179627 A1* | 9/2004 | Ketchum et al. ............... 375/267 |
| 2006/0280136 A1* | 12/2006 | Sezgin et al. ................ 370/294 |
| 2007/0015514 A1 | 1/2007 | Bishop |
| 2007/0104165 A1 | 5/2007 | Hanaoka et al. |
| 2008/0225993 A1* | 9/2008 | Malladi et al. ................ 375/340 |
| 2009/0060076 A1* | 3/2009 | Ma et al. ....................... 375/260 |
| 2009/0268644 A1 | 10/2009 | Sezgin et al. |
| 2010/0099401 A1 | 4/2010 | Bishop |
| 2012/0163253 A1 | 6/2012 | Sezgin et al. |

FOREIGN PATENT DOCUMENTS

| | | |
|---|---|---|
| JP | 2007-53768 A | 3/2007 |
| JP | 2007-134844 A | 5/2007 |
| WO | WO 2007/011632 A1 | 1/2007 |

OTHER PUBLICATIONS

Wang et al. "Conceptual Platform of Distributed Wireless Communication System", Vehicular Technology Conference, 2002. VTC Spring 2002, IEEE 55th vol. 2, May 2002 pp. 593-597.

* cited by examiner

RoF: Radio on Fiber
RAU: Radio Access Unit

RoF: Radio on Fiber
RAU: Radio Access Unit

RoF: Radio on Fiber
RAU: Radio Access Unit

RoF: Radio on Fiber
RAU: Radio Access Unit

RAU: Radio Access Unit
RoF: Radio on Fiber
VC: Virtual Cell

BASE STATION APPARATUS, MOBILE STATION APPARATUS, DISTRIBUTED ANTENNA WIRELESS COMMUNICATIONS SYSTEM, PILOT CHANNEL GENERATION METHOD, SYNCHRONIZATION CHANNEL GENERATION METHOD, AND ANTENNA SELECTION METHOD

TECHNICAL FIELD

The present invention relates to a base station apparatus and mobile station apparatus applied to a distributed wireless communications system (hereinafter, referred to as "DWCS"), and further, to synchronization channel and pilot channel generation and antenna selection method associated with selection of antennas in the DWCS.

BACKGROUND ART

In recent years, work has been proceeding on fourth generation (4G) mobile communication systems. The work includes required conditions such as a required frequency band, center frequency band, coexistence with the other systems and carriers, and application of various radio environments. Requirements as a radio access technique are 100 Mbps or more in the downlink in outdoor environments, 1 Gbps in isolated cells/stationary environments, and about 1 Gbps at the maximum even in indoor environments. One of candidates for the system to adopt as a radio access technique is an Orthogonal Frequency Division Multiple Access (hereinafter, referred to as "OFDMA") communication system using Orthogonal Frequency Division Multiple (hereinafter, referred to as "OFDM") techniques. Furthermore, the DWCS is proposed as a mobility network configuration (Non-patent Document 1).

FIG. 18 is a diagram showing a configuration outline of the DWCS. The DWCS is comprised of a three-layer structure of a radio access unit (hereinafter, referred to as "RAU"), base station (hereinafter, referred to as "BS") as an intermediate layer and core network (hereinafter, referred to as "CN"). The RAU has transmission/reception antennas and signal conversion apparatus extracted from the BS that has conventionally been the lowest layer in cellular systems, thus has a simplified configuration, and performs radio transmission/reception with a mobile station (hereinafter, referred to as "MS"). The BS is connected to a plurality of RAUs through radio optical fiber cables RoF (Radio on Fiber: hereinafter, referred to as "RoF"), converts a radio signal from the RAU into a baseband signal, while converting a baseband signal to the RAU into a radio signal, and thus performs high-speed parallel signal processing. High-speed channels are connected between BSs and between the BS and CN, and constitute a mobility network.

As shown in FIG. 18, each RAU (for example, RAU 1, 2, 3, ..., 10) is installed in a different position corresponding to a geographic position, service request, etc. Each BS (for example, BS 1, 2, 3) is connected to the RAU via RoF. The concept of the cell including a BS as a center in conventional cellular systems is eliminated, and as a substitute, a virtual cell (hereinafter, referred to as "VC") is constructed using the MS (for example, MS 1, 2) as a center. For example, the MS 1 constructs a VC with RAUs 8 and 9, while the MS 2 constructs a VC with RAUs 3, 4 and 5. The mobility network control system (including the CN) selects a set of antennas i.e. a set of RAUs corresponding to a location position of an MS and service request, and allocates the set to the MS as a VC. The VC is switched according to transmission/reception radio signal environment, moving speed, location position, etc. of the MS. The DWCS enables actualization of user data transmission speeds and system capacity that are higher than in the conventional cellular system, and is considered one of promising candidates for the fourth generation (4G) mobile communication system.

Non-patent Document 1: Shidong Zhou, Ming Zhao, Xibin Xu, Jing Wang. "Distributed Wireless Communication System: A New Architecture for Future Public Wireless Access" IEEE Communications Magazine 2003, 41 (March 3) P 108-113

DISCLOSURE OF INVENTION

Problems to be Solved by the Invention

In the above-mentioned DWCS, system characteristics are significantly affected by the configuration of a VC and VC switching method (including an antenna selection method). However, there has been no proposal on configurations of a synchronization channel (hereinafter, referred to as "SCH") and pilot channel (hereinafter, referred to as "PiCH") and antenna selection method associated with selection of antennas suitable for the configuration of the DWCS i.e. the configuration of a VC and VC switching method.

The present invention was made in view of such circumstances, and it is an object of the invention to provide a BS and MS suitable for the configuration of the DWCS on the premise of the OFDMA communication system in which a single frequency is used repeatedly for a plurality of RAUs, and to configure the DWCS. It is another object to provide a PiCH generation method, SCH generation method and antenna selection method suitable for the DWCS.

Means for Solving the Problem (1) To attain the above-mentioned objects, the present invention took measures as described below. In other words, a base station apparatus (BS) of the invention is a base station apparatus (BS) that is applied to a distributed wireless communications system (DWCS) and that controls at least one of radio access unit apparatuses (RAUs) for performing radio communications with mobile station apparatuses (MSs), and is characterized by having a control signal generating section which generates a plurality of mutually different first pilot signals (Pilots 1) and a second pilot signal (Pilot 2) based on control data input from a core network apparatus (CN) constituting the distributed wireless communications system, combines the first pilot signals (Pilots 1) and the second pilot signal (Pilot 2), and thereby generates specific pilot channels (PiCHs) for each of the radio access unit apparatuses (RAUs), and a transmitting section that transmits the specific pilot channels (PiCHs) respectively to the radio access unit apparatuses.

By thus combining the first pilot channels (Pilots 1) and the second pilot channel (Pilot 2), specific pilot channels (PiCHs) are generated for each of radio access unit apparatuses (RAUs). In this case, for example, it is possible to allocate a different first pilot signal (Pilot 1) to each of radio access unit apparatuses (RAUs) belonging to the base station apparatus (BS), while allocating the same second pilot signal (Pilot 2) to each of radio access unit apparatuses (RAUs) belonging to the base station apparatus (BS). By this means, interference of pilot channels (PiCHs) is reduced in different radio access unit apparatuses (RAUs) belonging to the same base station apparatus (BS) and in the same radio access unit apparatuses (RAUs) belonging to different base station apparatuses (BSs), and it is possible to enhance radio propagation path estimation accuracy between the mobile station apparatus (MS) and each antenna.

(2) Further, in the base station apparatus (BS) of the invention, the control signal generating section is characterized by associating a base station apparatus (BS) number with a code number of a second synchronization channel (SCH 2) between first and second synchronization channels (SCHs 1, 2), and thereby generating a synchronization channel (SCH).

Thus, since a base station apparatus (BS) number is associated with a code number of the second synchronization channel (SCH 2), it is possible to identify an antenna number by detecting the code number of the second synchronization channel (SCH 2) and the second pilot signal (Pilot 2).

(3) Further, in the base station apparatus (BS) of the invention, the control signal generating section is characterized by associating a radio access unit apparatus (RAU) number with a code number of the first synchronization channel (SCH 1) between the first and second synchronization channels (SCHs 1, 2), and thereby generating a synchronization channel (SCH).

Thus, since a radio access unit apparatus (RAU) number is associated with a code number of the first synchronization channel (SCH 1), it is possible to identify an antenna number by detecting the first synchronization channel (SCH 1) and second synchronization channel (SCH 2).

(4) Further, a mobile station apparatus (MS) of the invention is a mobile station apparatus (MS) that is applied to a distributed wireless communications system (DWCS) and that performs radio communications with a radio access unit apparatus (RAU) controlled by a base station apparatus (BS), and is characterized by having a receiving section that receives a radio signal transmitted from the radio access unit apparatus (RAU), a control signal extracting section that extracts a synchronization channel (SCH) and a pilot channel (PiCH) from the received radio signal, and an antenna selecting section which detects a base station apparatus (BS) number from a code number of a second synchronization channel (SCH 2) in the extracted synchronization channel (SCH), while detecting a number of the radio access unit apparatus (RAU) from a code number of a first pilot signal (Pilot 1) in the extracted pilot channel (PiCH), and thereby identifies an antenna number of the radio access unit apparatus (RAU).

Thus, a base station apparatus (BS) number is detected from a code number of the second synchronization channel (SCH 2), while a radio access unit apparatus (RAU) number is detected from a code number of the first pilot signal (Pilot 1), an antenna number of the radio access unit apparatus (RAU) is thereby identified, and it is thus possible to actualize a communication system for reducing overhead of the synchronization channel (SCH) and decreasing code lengths, transmission time, transmission frequency bandwidth, etc. It is further possible to improve initial synchronization of OFDM reception signal and antenna selection characteristics (such as detection time and detection probability) and to reduce complexity and power consumption in the MS.

(5) Further, a mobile station apparatus (MS) of the invention is a mobile station apparatus (MS) that is applied to a distributed wireless communications system (DWCS) and that performs radio communications with a radio access unit apparatus (RAU) controlled by a base station apparatus (BS), and is characterized by having a receiving section that receives a radio signal transmitted from the radio access unit apparatus (RAU), a control signal extracting section that extracts a synchronization channel (SCH) from the received radio signal, and an antenna selecting section which detects a number of a radio access unit apparatus (RAU) from a code number of a first synchronization channel (SCH 1) in the extracted synchronization channel (SCH), while detecting a base station apparatus (BS) number from a code number of a second synchronization channel (SCH 2) in the extracted synchronization channel (SCH), and thereby identifies an antenna number of the radio access unit apparatus (RAU).

Thus, a radio access unit apparatus (RAU) number is detected from a code number of the first synchronization channel (SCH 1), a base station apparatus (BS) number is detected from a code number of the second synchronization channel (SCH 2), an antenna number of the radio access unit apparatus (RAU) is thereby identified, and it is thus possible to actualize a communication system for reducing overhead of the synchronization channel (SCH) and decreasing code lengths, transmission time, transmission frequency bandwidth, etc. It is further possible to improve initial synchronization of OFDM reception signal and antenna selection characteristics (such as detection time and detection probability) and to reduce complexity and power consumption in the MS.

(6) Further, a radio communication system of the invention is characterized by being comprised of at least one radio access unit apparatus (RAU) for performing radio communications with a mobile station apparatus (MS), at least one base station apparatus (BS) for controlling the radio access unit apparatus (RAU), and a core network apparatus (CN) for controlling the base station apparatus (BS).

Thus, the mobile station apparatus (MS) detects a base station apparatus (BS) number from a code number of the second synchronization channel (SCH 2), while detecting a radio access unit apparatus (RAU) number from a code number of the pilot channel (PiCH), and thereby identifies an antenna number of the radio access unit apparatus (RAU). By this means, it is possible to actualize a communication system for reducing overhead of the synchronization channel (SCH) and decreasing code lengths, transmission time, transmission frequency bandwidth, etc. It is further possible to improve initial synchronization of OFDM reception signal and antenna selection characteristics (such as detection time and detection probability) and to reduce complexity and power consumption in the MS.

(7) Further, a distributed wireless communications system (DWCS) of the invention is characterized by being comprised of at least one radio access unit apparatus (RAU) for performing radio communications with a mobile station apparatus (MS), at least one base station apparatus (BS) for controlling the radio access unit apparatus (RAU), and a core network apparatus (CN) for controlling the base station apparatus (BS).

Thus, the mobile station apparatus (MS) detects a radio access unit apparatus (RAU) number from a code number of the first synchronization channel (SCH 1), while detecting a base station apparatus (BS) number from a code number of the second synchronization channel (SCH 2), and thereby identifies an antenna number of the radio access unit apparatus (RAU). By this means, it is possible to actualize a communication system for reducing overhead of the synchronization channel (SCH) and decreasing code lengths, transmission time, transmission frequency bandwidth, etc. It is further possible to improve initial synchronization of OFDM reception signal and antenna selection characteristics (such as detection time and detection probability) and to reduce complexity and power consumption in the MS.

(8) Further, a pilot channel (PiCH) generation method of the invention is a pilot channel (PiCH) generation method applied to a distributed wireless communications system (DWCS), and is characterized by including at least the steps of generating a plurality of mutually different first pilot signals (Pilots 1) and a second pilot signal (Pilot 2) based on control data input from a core network apparatus (CN) constituting the distributed wireless communications system, and combining the first pilot signals (Pilots 1) and the second pilot signal (Pilot 2), and thereby generating specific pilot channels (PiCHs) for each of radio access unit apparatuses (RAUs) that perform radio communications with mobile station apparatuses (MSs).

By thus combining the first pilot channels (Pilots 1) and the second pilot channel (Pilot 2), specific pilot channels (PiCHs) are generated for each of radio access unit apparatuses (RAUs). In this case, for example, it is possible to allocate a different first pilot signal (Pilot 1) to each of radio access unit apparatuses (RAUs) belonging to the base station apparatus (BS), while allocating the same second pilot signal (Pilot 2) to each of radio access unit apparatuses (RAUs) belonging to the base station apparatus (BS). By this means, interference of pilot channels (PiCHs) is reduced in different radio access unit apparatuses (RAUs) belonging to the same base station apparatus (BS) and in the same radio access unit apparatuses (RAUs) belonging to different base station apparatuses (BSs), and it is possible to enhance radio propagation path estimation accuracy between the mobile station apparatus (MS) and each antenna.

(9) Further, a synchronization channel (SCH) generation method of the invention is a synchronization channel (SCH) generation method applied to a distributed wireless communications system (DWCS), and is characterized by associating a number of a base station apparatus (BS) that controls a radio access unit apparatus (RAU) for performing radio communications with a mobile station apparatus (MS) with a code number of a second synchronization channel (SCH 2) between first and second synchronization channels (SCHs 1, 2) based on control data input from a core network apparatus (CN) constituting the distributed wireless communications system (DWCS), and thereby generating a synchronization channel (SCH).

Thus, since a base station apparatus (BS) number is associated with a code number of the second synchronization channel (SCH 2), it is possible to identify an antenna number by detecting the code number of the second synchronization channel (SCH 2) and the second channel (PiCH) signal.

(10) Further, in the synchronization channel (SCH) generation method of the invention, it is a feature that a radio access unit apparatus (RAU) number is associated with a code number of the first synchronization channel (SCH 1) between the first and second synchronization channels (SCHs 1, 2), and that a synchronization channel (SCH) is thereby configured.

Thus, since a radio access unit apparatus (RAU) number is associated with a code number of the first synchronization channel (SCH 1), it is possible to identify an antenna number by detecting the first synchronization channel (SCH 1) and second synchronization channel (SCH 2).

(11) Further, an antenna selection method of the invention is an antenna selection method in a mobile station apparatus (MS) that is applied to a distributed wireless communications system (DWCS) and that performs radio communications with a radio access unit apparatus (RAU) controlled by a base station apparatus (BS), and is characterized by including at least the steps of receiving a radio signal transmitted from the radio access unit apparatus (RAU), extracting a synchronization channel (SCH) and a pilot channel (PiCH) from the received radio signal, detecting a base station apparatus (BS) number from a code number of a second synchronization channel (SCH 2) in the extracted synchronization channel (SCH), detecting a number of the radio access unit apparatus (RAU) from a code number of the extracted pilot channel (PiCH), and identifying an antenna number of the radio access unit apparatus (RAU) based on the detected radio access unit apparatus (RAU) number and base station apparatus (BS) number.

Thus, a base station apparatus (BS) number is detected from a code number of the second synchronization channel (SCH 2), a radio access unit apparatus (RAU) number is detected from a code number of the pilot channel (PiCH), an antenna number of the radio access unit apparatus (RAU) is identified based on the radio access unit apparatus (RAU) number and the base station apparatus (BS) number, and it is thus possible to actualize a communication system for reducing overhead of the synchronization channel and decreasing code lengths, transmission time, transmission frequency band width, etc. By this means, improved are initial synchronization of OFDM reception signal and antenna selection characteristics (such as detection time and detection probability), and it is possible to reduce complexity and power consumption in the MS.

(12) Further, an antenna selection method of the invention is an antenna selection method in a mobile station apparatus (MS) that is applied to a distributed wireless communications system (DWCS) and that performs radio communications with a radio access unit apparatus (RAU) controlled by a base station apparatus (BS), and is characterized by including at least the steps of receiving a radio signal transmitted from the radio access unit apparatus (RAU), extracting a synchronization channel (SCH) from the received radio signal, detecting a number of a radio access unit apparatus (RAU) from a code number of a first synchronization channel (SCH 1) in the extracted synchronization channel (SCH), detecting a base station apparatus (BS) number from a code number of a second synchronization channel (SCH 2) in the extracted synchronization channel (SCH), and identifying an antenna number of the radio access unit apparatus (RAU) based on the detected number of the radio access unit apparatus (RAU) and the detected base station apparatus (BS) number.

Thus, a number of a radio access unit apparatus (RAU) is detected from a code number of the first synchronization channel (SCH 1), a number of a base station apparatus (BS) is detected from a code number of the second synchronization channel (SCH 2), an antenna number of the radio access unit apparatus (RAU) is thereby identified, and it is thus possible to actualize a communication system for reducing overhead of the synchronization channel (SCH) and decreasing code lengths, transmission time, transmission frequency bandwidth, etc. By this means, improved are initial synchronization of OFDM reception signal and antenna selection characteristics (such as detection time and detection probability), and it is possible to reduce complexity and power consumption in the MS.

Advantageous Effect of the Invention

According to the invention, in the DWCS, a different first pilot signal (referred to as "Pilot 1") is allocated to each RAU belonging to the BS, the same second pilot signal (referred to as "Pilot 2") is allocated to each RAU belonging to the BS, and the PiCH specific to each RAU can be configured by combining Pilot 1 and Pilot 2. By a combination of Pilot 1 and Pilot 2, it is possible to reduce interference of PiCH signal between RAUs and between BSs. Further, by detecting Pilot 1 and Pilot 2, it is possible to identify the BS number and RAU number. Furthermore, by auto-correlation and cross-correlation characteristics of Pilot 1 and Pilot 2 codes, the MS enhances accuracy in characteristic estimation (channel estimation) of a radio propagation path from each RAU, and it is thereby possible to increase data transmission speed of the system and improve characteristics such as system capacity.

Moreover, according to the invention, in the DWCS, it is possible to detect a BS number by associating the BS number with the code number of the second synchronization channel (referred to as "SCH 2"). Further, according to the invention, in the DWCS, an RAU number is associated with a code number of the first synchronization channel (referred to as "SCH 1"), a BS number is further associated with a code number of the SCH 2, and it is thereby possible to configure the SCH including the SCH 1 and SCH 2. Since the code number of the SCH 1 is associated with the RAU number, by detecting the code number of the SCH 1 and the code number of the SCH 2, it is possible to identify an antenna number.

DESCRIPTION OF SYMBOLS

Figure 1:
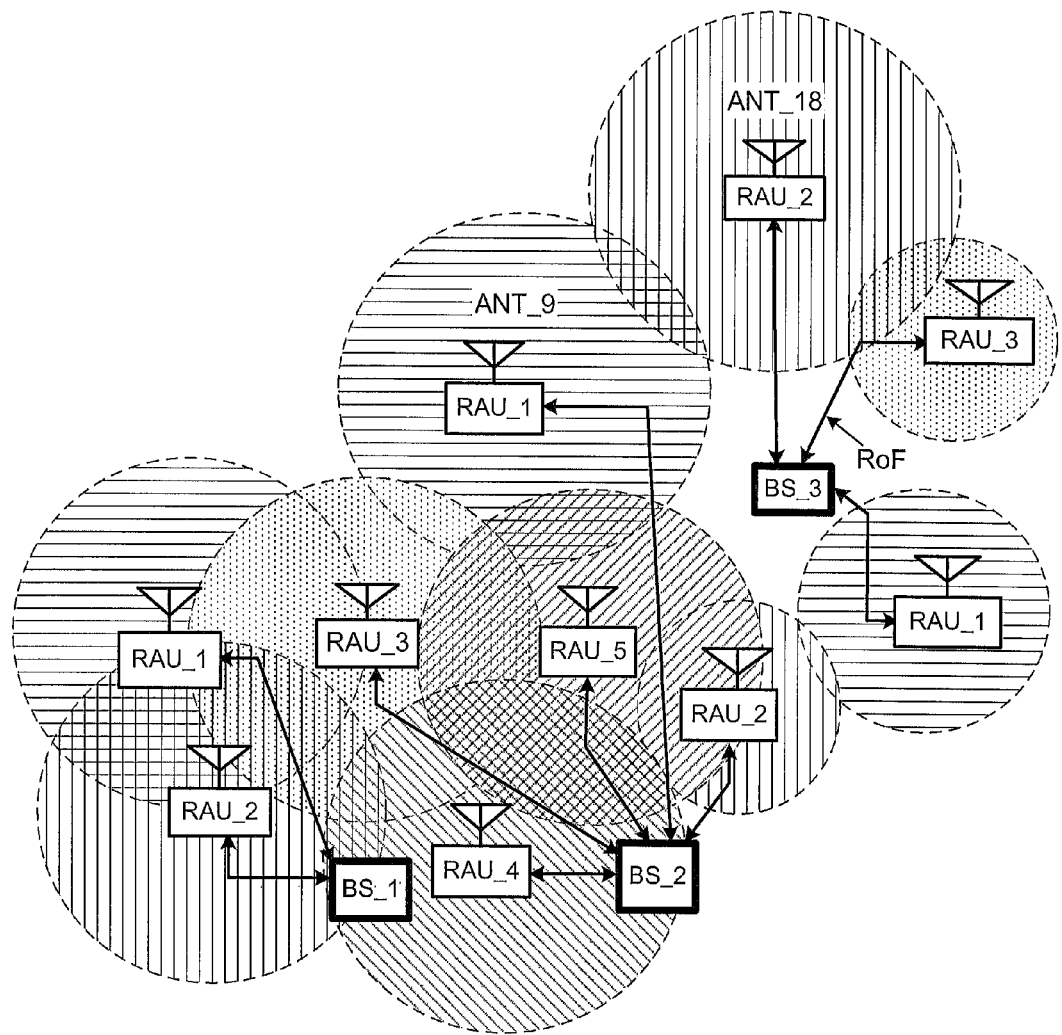
FIG. 1 is a diagram illustrating a concept of Embodiment 1.

10 BS
11 Coding section
12 Serial/parallel transform (S/P) section
13 Control signal generating section
14 Channel allocating section
15 Modulation section
16 IFFT section
17 Parallel/serial (P/S) transform section
18 CP inserting section
19 DAC section
20 Radio transmission section
21 RoF conversion section
22 Scheduling section
30 MS
31 Radio reception section
31a, 31b Antenna
33 CP removing section
34 Serial/parallel transform (S/P) section
35 FFT section
36 Demodulation section
37 Channel demultiplexing section
38 Control signal extracting section
39 Parallel/serial transform (P/S) section
40 Decoding section
41 Channel estimating/CQI measuring section
42 Antenna selecting section
MS Mobile station apparatus
RAU Radio access unit
BS Base station apparatus
CN Core network apparatus
RoF Radio optical fiber cable
VC Virtual cell

BEST MODE FOR CARRYING OUT THE INVENTION (Embodiment 1)

It is a basic concept of Embodiment 1 of the invention to allocate a different Pilot 1 to each RAU belonging to a BS, allocate the same Pilot 2 to each RAU belonging to the BS, and configure a PiCH specific to each RAU by combining the Pilot 1 and Pilot 2.

First, the following symbols are defined:
Antenna number ANT_g (g=1, 2, 3, . . . , G)
RAU number RAU_i (i=1, 2, 3, . . . , I)
BS number BS_j (j=1, 2, 3, . . . , J)
Code number of Pilot 1 Pilot 1_m (m=1, 2, 3, . . . , M)
Code number of Pilot 2 Pilot 2_n (n=1, 2, 3, . . . , N)

Defined next are the total number G of antennas, the total number I of RAUs and the total number J of BSs. In other words, it is assumed that G=I×J. For example, in the case of G=512, it is possible to select I=8 and J=64 or I=4 and J=128. Designed further are M (M>=1) Pilot 1 codes and N (N>=1) Pilot 2 codes (described later). A single Pilot 1 code is selected from M Pilot 1 codes and allocated to a single RAU belonging to a single BS (associate i with m), and a single RAU transmits a single Pilot 1. J Pilot 2 codes are selected from N Pilot 2 codes and allocated to J BSs (associate j with n), and the same Pilot 2 is transmitted to I RAUs belonging to BS_j. A PiCH specific to each antenna is configured by combining the Pilot 1 and pilot 2 codes.

Figure 2:
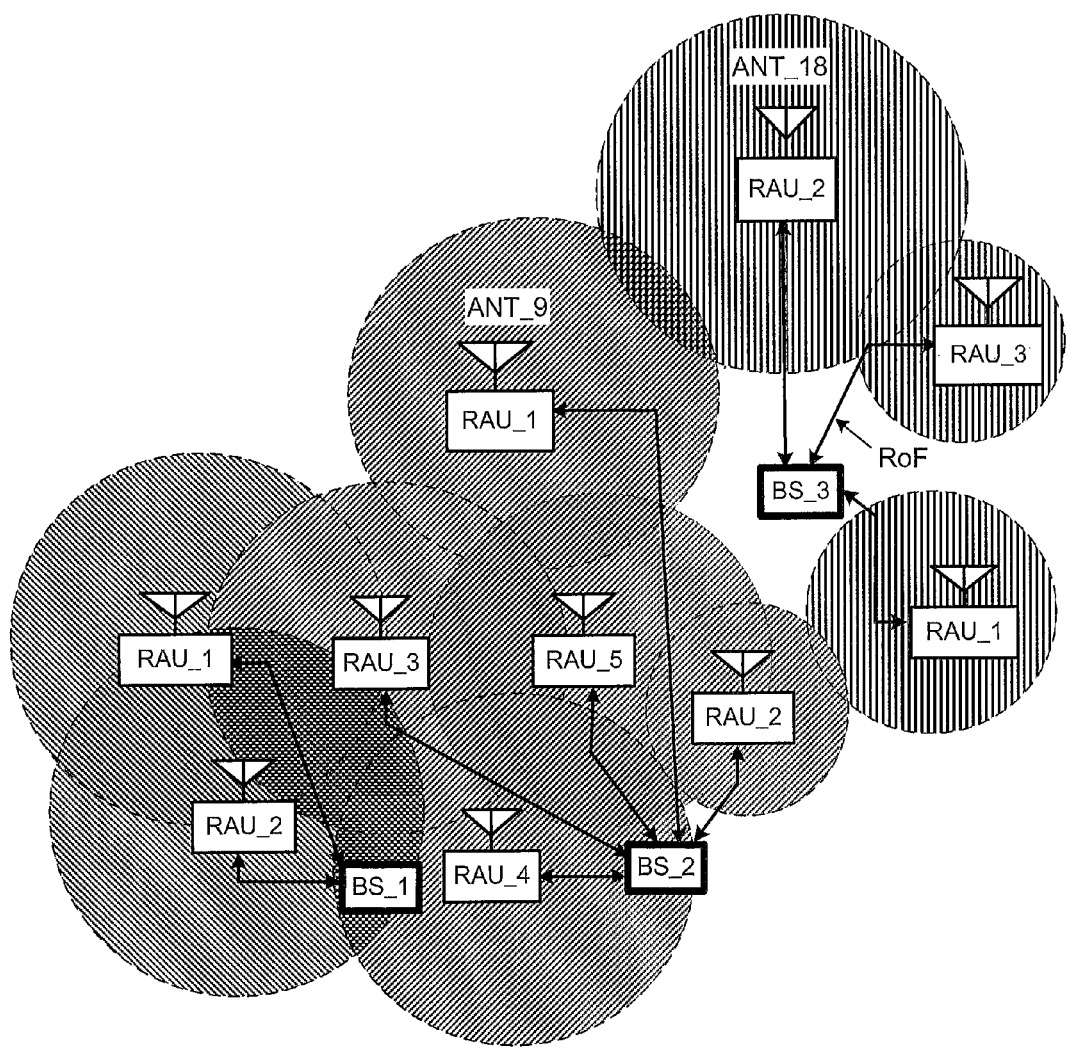
FIG. 2 is another diagram illustrating the concept of Embodiment 1.

FIGS. 1 and 2 are diagrams illustrating the concept of Embodiment 1. FIG. 1 illustrates allocation of Pilot 1_m to RAU_i among RAUs (I=8). For example, Pilot 1_1 and Pilot 1_2 are allocated to RAUs_1, 2 belonging to BS_1. Further, Pilot 1_1, Pilot 1_2, Pilot 1_3, Pilot 1_4 and Pilot 1_5 are allocated to RAUs_1, 2,3,4,5 belonging to BS_2. Furthermore, Pilot 1_1, Pilot 1_2 and Pilot 1_3 are allocated to RAUs_1,2,3 belonging to BS_3.

In FIG. 1, a cover area of RAU_1 assigned Pilot 1_1 is indicated by the horizontal lines, and a cover area of RAU_2 assigned Pilot 1_2 is indicated by the vertical lines. Further, a cover area of RAU_3 assigned Pilot 1_3 is indicated by dotted shading, a cover area of RAU_4 assigned Pilot 1_4 is indicated by the right-downward oblique lines, and a cover area of RAU_5 assigned Pilot 1_5 is indicated by the right-upward oblique lines.

FIG. 2 illustrates allocation of Pilot 2_n to BS_j among BSs (J=64). For example, Pilot 2_1 is allocated to BS_1, and Pilot 2_2 is allocated to BS_2. Further, Pilot 2_3 is allocated to BS_3. In FIG. 2, a cover area of BS_1 assigned Pilot 2_1 is indicated by the bold right-downward oblique lines, and a cover area of BS_2 assigned Pilot 2_2 is indicated by the bold right-upward oblique lines. Further, a cover area of BS_3 assigned Pilot 2_3 is indicated by the bold vertical lines.

With consideration given to overlapping FIGS. 1 and 2, by combining I Pilots 1 and J Pilots 2, it is possible to configure the PiCH specific to each antenna among G antennas in the system.

Described next is design of Pilots 1, 2 codes (code, sequence, etc.) The Pilot 1 codes can be configured using codes with length k (k=1, 2, 3, . . . , K), and the number M of codes (m=1, 2, 3, . . . , M), and the Pilot 2 codes can be configured using codes with length q (q=1, 2, 3, . . . , Q), and the number N of codes (n=1, 2, 3, . . . , N). In order to maximize auto-correlation characteristics and minimize cross-correlation characteristics in Pilots 1, 2 codes, for example, it is possible to use random codes such as, for example, PN sequence (Pseudorandom Noise sequence), orthogonal codes such as, for example, Walsh codes and OVSF sequence (Orthogonal Variable Spreading Factor sequence), and phase rotation codes such as, for example, CAZAC sequence (Constant Amplitude Zero Auto-Correlation sequence), GCL sequence (Generalized Chirp-Like sequence) and ZC sequence (Zadoff-Chu sequence).

Figure 3A:
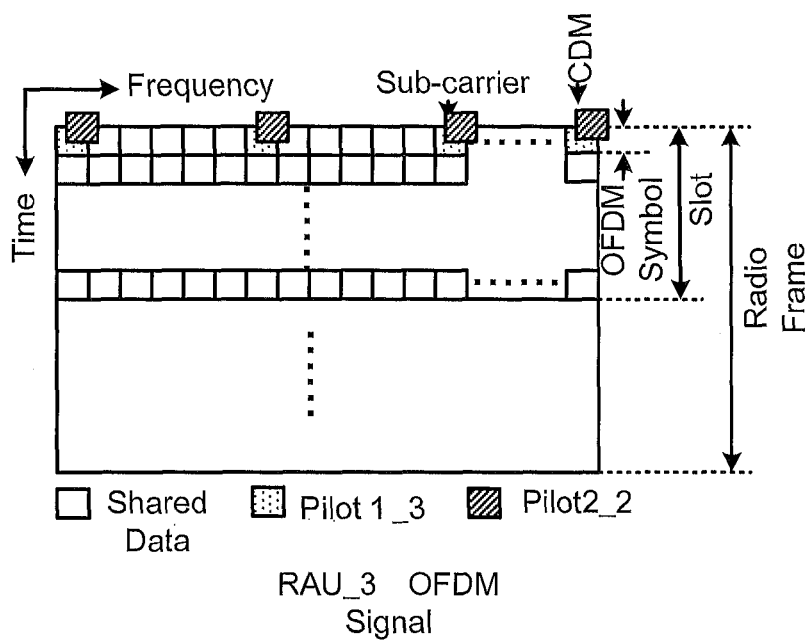
FIG. 3A is a diagram illustrating code multiple of Pilots 1, 2 codes associated with RAU_3 of BS_2 and Pilots 1, 2 codes associated with RAU_4 of BS_2 corresponding to FIGS. 1 and 2.
Figure 3B:
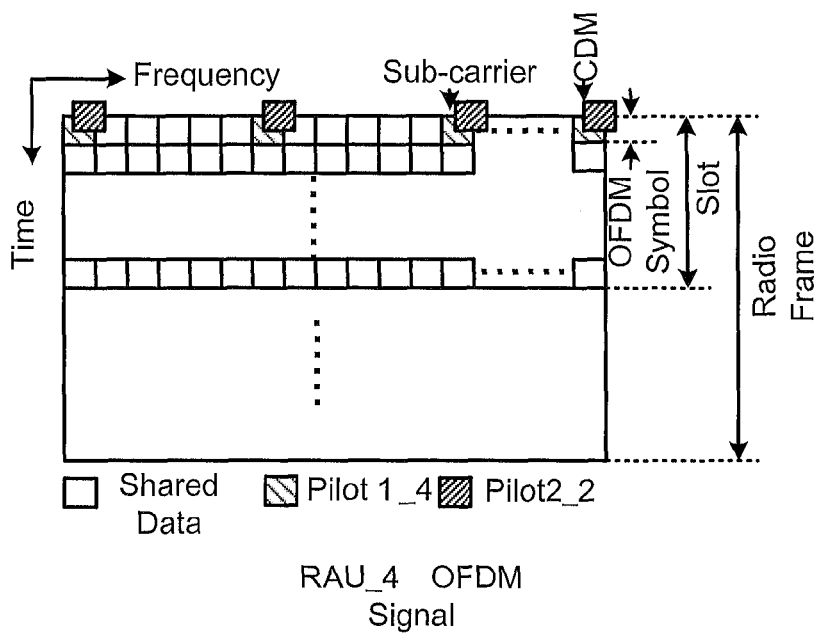
FIG. 3B is another diagram illustrating code multiple of Pilots 1, 2 codes associated with RAU_3 of BS_2 and Pilots 1, 2 codes associated with RAU_4 of BS_2 corresponding to FIGS. 1 and 2.

FIGS. 3A and 3B are diagrams showing an example of Code Division Multiple (hereinafter, referred to as "CDM") of Pilots 1,2 codes between RAUs based on the OFDMA communication system. FIGS. 3A and 3B illustrate CDM of Pilots 1, 2 codes associated with RAU_3 of BS_2 and Pilots 1, 2 codes associated with RAU_4 of BS_2 corresponding to FIGS. 1 and 2. More specifically, in FIG. 1, Pilot 1_3 allocated to RAU_3 under BS_2 is shown by dotted shading, and Pilot 1_4 allocated to RAU_4 under BS_2 is shown by the right-downward oblique lines. Corresponding thereto, Pilot 1_3 in FIG. 3A is shown by dotted shading, and Pilot 1_4 in FIG. 3B is shown by the right-downward oblique lines. Further, in FIG. 2, the cover areas of RAU_1 to RAU_5 managed by BS_2 are shown by the bold right-upward oblique lines. Corresponding thereto, Pilot 2_2 in FIGS. 3A and 3B is shown by the bold right-upward oblique lines. In this case, since CDM, sub-carriers assigned Pilots 1, 2 codes of RAU_3 and RAU_4 are the same in FIGS. 3A and 3B.

Figure 4A:
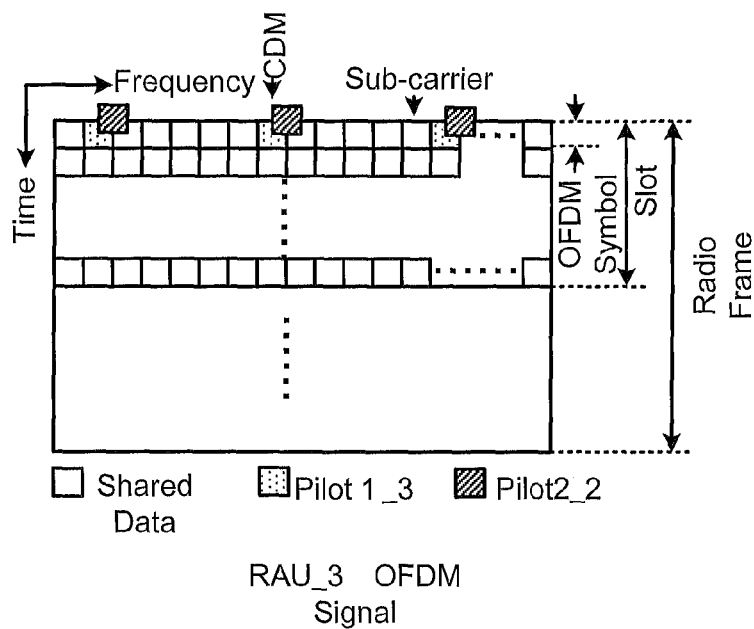
FIG. 4A is a diagram illustrating frequency (sub-carrier) multiple of Pilots 1, 2 codes associated with RAU_3 of BS_2 and Pilots 1, 2 codes associated with RAU_4 of BS_2 corresponding to FIGS. 1 and 2.
Figure 4B:
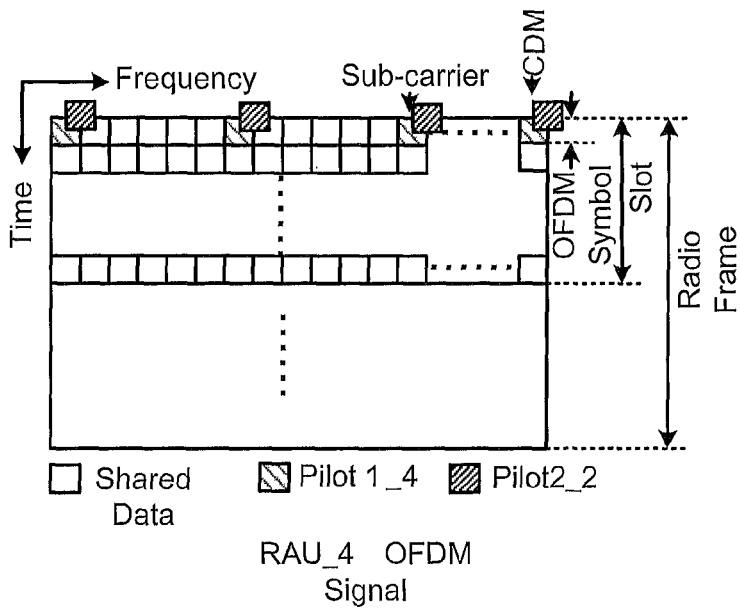
FIG. 4B is another diagram illustrating frequency (sub-carrier) multiple of Pilots 1, 2 codes associated with RAU_3 of BS_2 and Pilots 1, 2 codes associated with RAU_4 of BS_2 corresponding to FIGS. 1 and 2.

FIGS. 4A and 4B are diagrams showing an example of Frequency Division Multiple (hereinafter, referred to as "FDM") of Pilots 1,2 codes between RAUs based on the OFDMA communication system. FIGS. 4A and 4B illustrate frequency (sub-carrier) multiple of Pilots 1, 2 codes associated with RAU_3 of BS_2 and Pilots 1, 2 codes associated with RAU_4 of BS_2 corresponding to FIGS. 1 and 2. More specifically, in FIG. 1, Pilot 1_3 allocated to RAU_3 under BS_2 is shown by dotted shading, and Pilot 1_4 allocated to RAU_4 under BS_2 is shown by the right-downward oblique lines. Corresponding thereto, Pilot 1_3 in FIG. 4A is shown by dotted shading, and Pilot 1_4 in FIG. 4B is shown by the right-downward oblique lines. Further, in FIG. 2, the cover areas of RAU_1 to RAU_5 managed by BS_2 are shown by the bold right-upward oblique lines. Corresponding thereto, Pilot 2_2 in FIGS. 4A and 4B is shown by the bold right-upward oblique lines. In this case, since FDM, sub-carriers assigned Pilots 1, 2 codes of RAU_3 and RAU_4 are shifted by one in the frequency-axis direction in FIGS. 4A and 4B.

Figure 5A:
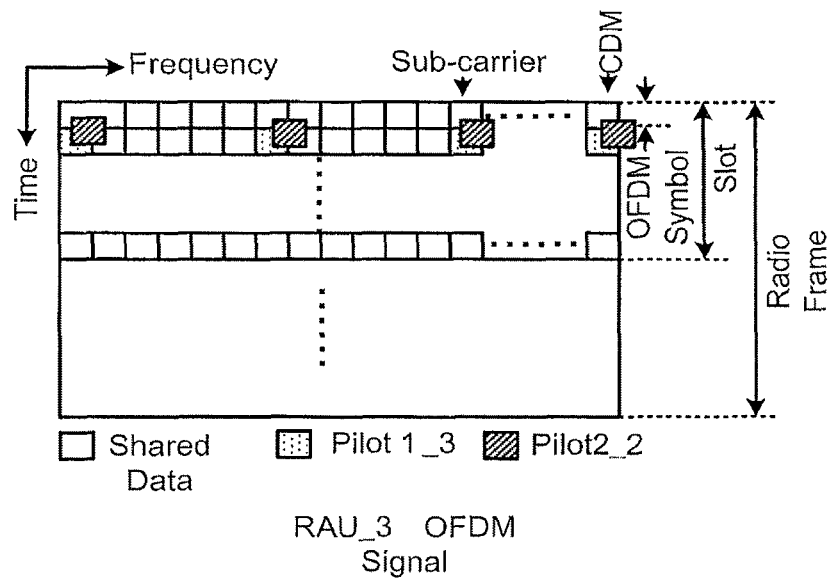
FIG. 5A is a diagram illustrating time (OFDM symbol) multiple of Pilots 1, 2 codes associated with RAU_3 of BS_2 and Pilots 1, 2 codes associated with RAU_4 of BS_2 corresponding to FIGS. 1 and 2.
Figure 5B:
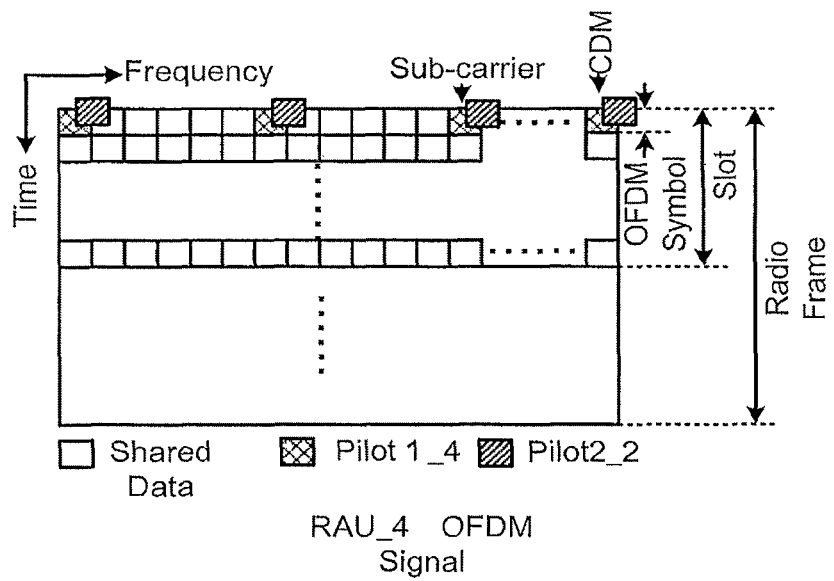
FIG. 5B is another diagram illustrating time (OFDM symbol) multiple of Pilots 1, 2 codes associated with RAU_3 of BS_2 and Pilots 1, 2 codes associated with RAU_4 of BS_2 corresponding to FIGS. 1 and 2.

FIGS. 5A and 5B are diagrams showing an example of Time Division Multiple (hereinafter, referred to as "TDM") of Pilots 1,2 codes between RAUs based on the OFDMA communication system. FIGS. 5A and 5B illustrate time (OFDM symbol) multiple of Pilots 1, 2 codes associated with RAU_3 of BS_2 and Pilots 1, 2 codes associated with RAU_4 of BS_2 corresponding to FIGS. 1 and 2. More specifically, in FIG. 1, Pilot 1_3 allocated to RAU_3 under BS_2 is shown by dotted shading, and Pilot 1_4 allocated to RAU_4 under BS_2 is shown by the right-downward oblique lines. Corresponding thereto, Pilot 1_3 in FIG. 5A is shown by dotted shading, and Pilot 1_4 in FIG. 5B is shown by the right-downward oblique lines. Further, in FIG. 2, the cover areas of RAU_1 to RAU_5 managed by BS_2 are shown by the bold right-upward oblique lines. Corresponding thereto, Pilot 2_2 in FIGS. 5A and 5B is shown by the bold right-upward oblique lines. In this case, since TDM, OFDM symbols assigned Pilots 1, 2 codes of RAU_3 and RAU_4 are shifted by one in the time-axis direction in FIGS. 5A and 5B.

Figure 6A:
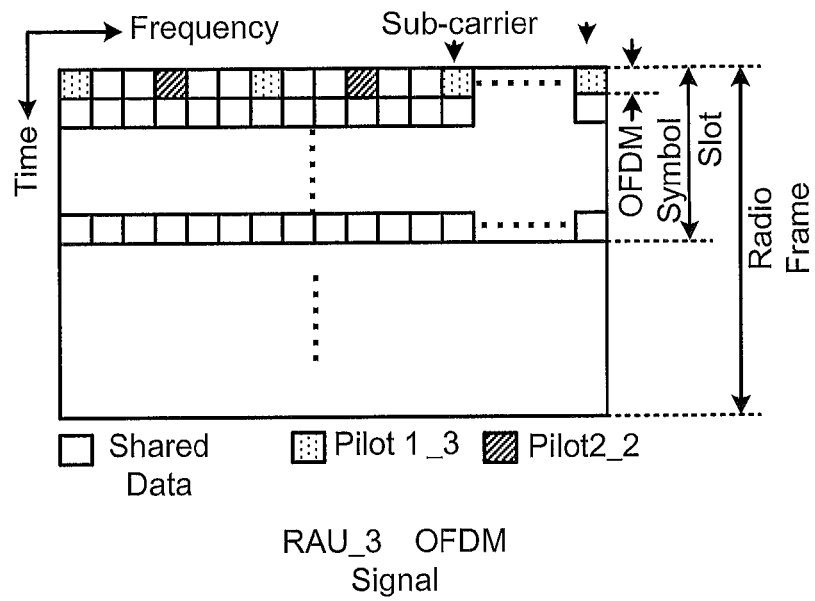
FIG. 6A is a diagram illustrating execution of frequency multiple on Pilots 1, 2 codes associated with RAU_3 of BS_2.
Figure 6B:
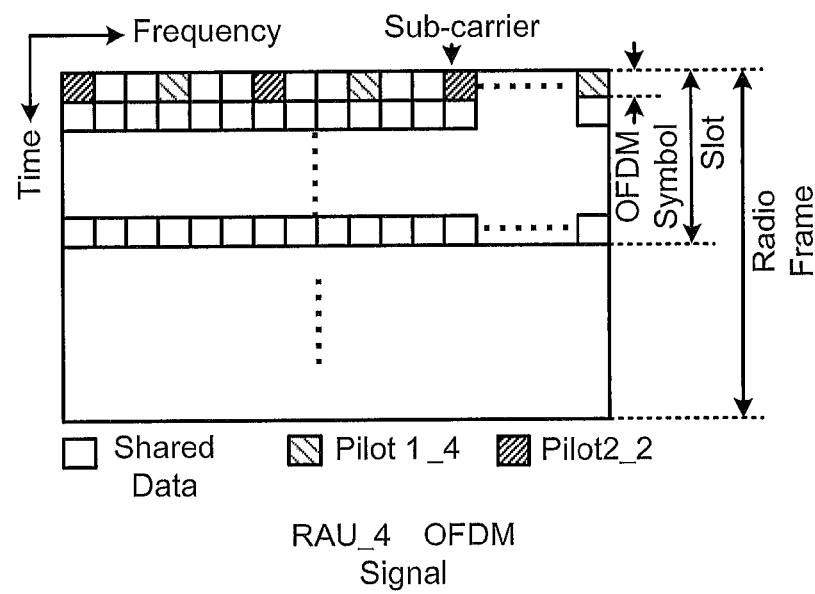
FIG. 6B is another diagram illustrating execution of frequency multiple on Pilots 1, 2 codes associated with RAU_4 of BS_2.
Figure 7A:
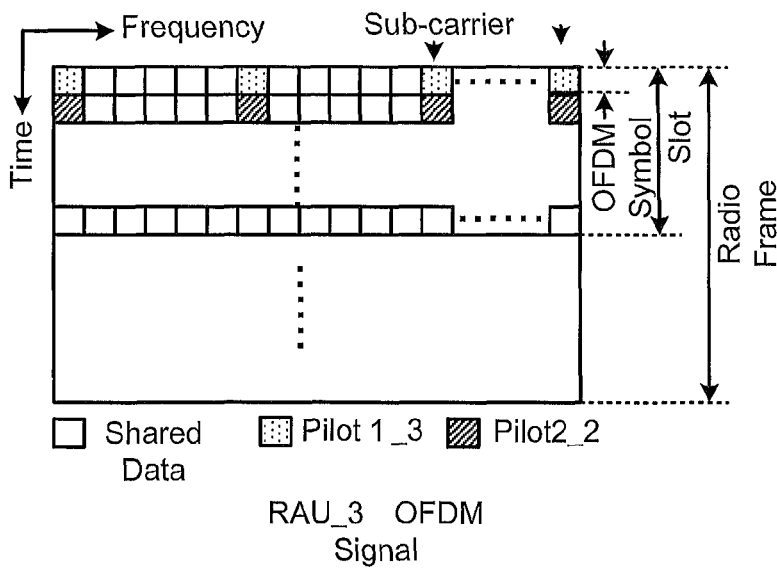
FIG. 7A is a diagram illustrating execution of time multiple on Pilots 1, 2 codes associated with RAU_3 of BS_2.
Figure 7B:
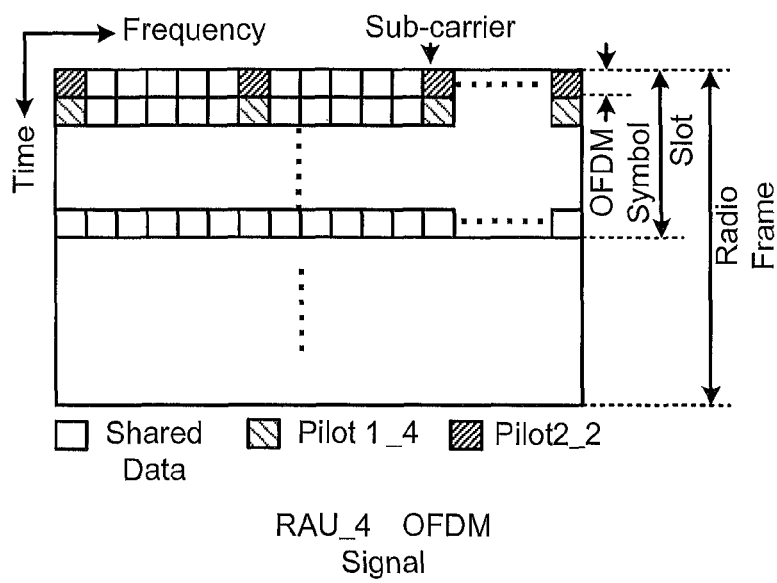
FIG. 7B is another diagram illustrating execution of time multiple on Pilots 1, 2 codes associated with RAU_4 of BS_2.

FIGS. 3A and 3B, FIGS. 4A and 4B and FIGS. 5A and 5B show examples of CDM of Pilots 1, 2 codes in the RAU, and of CDM, FDM and TDM of Pilots 1, 2 codes between RAUs, respectively. Further, FIG. 6A is a diagram illustrating execution of FDM on Pilots 1, 2 codes associated with RAU_3 of BS_2. Further, FIG. 6B is a diagram illustrating execution of FDM on Pilots 1, 2 codes associated with RAU_4 of BS_2. FIG. 7A is a diagram illustrating execution of TDM on Pilots 1, 2 codes associated with RAU_3 of BS_2. Further, FIG. 7B is a diagram illustrating execution of TDM on Pilots 1, 2 codes associated with RAU_4 of BS_2. As shown in FIGS. 6A and 6B and FIGS. 7A and 7B, Pilots 1, 2 codes in the RAU can undergo FDM and TDM, and as in FIGS. 3A and 3B, FIGS. 4A and 4B and FIGS. 5A and 5B, it is possible to perform CDM, FDM and TDM (similar to FIGS. 3A and 3B, FIGS. 4A and 4B and FIGS. 5A and 5B and not shown in the figure) of Pilots 1, 2 codes between RAUs. Further, it is also possible to adopt frequency hopping and shift method of Pilots 1, 2 codes in the RAU and between RAUs on the frequency axis and time axis. Multiple methods (cases) of Pilots 1, 2 codes in the RAU and between RAUs are summarized in Table 1. Further, as an example, FIGS. 3A and 3B and FIGS. 6A and 6B show that Pilots 1, 2 are arranged respectively with five or two sub-carriers therebetween in the RAU, and actually, in the case of FDM between RAUs, the number of sub-carriers between Pilots 1, 2 is dependent on the total number I of RAUs. For example, when I=8, the number of sub-carriers is eight or more. Similarly, in the case of TDM between RAUs, eight OFDM symbols are used.

TABLE 1

| Between RAUs | In RAU | | |
|---|---|---|---|
| | CDM | FDM | TDM |
| CDM | Case 1 (FIGS. 3A, 3B) | Case 4 (FIGS. 6A, 6B) | Case 7 (FIGS. 7A, 7B) |
| FDM | Case 2 (FIGS. 4A, 4B) | Case 5 (FIGS. 4A, 4B for reference) | Case 8 (FIGS. 4A, 4B for reference) |
| TDM | Case 3 (FIGS. 5A, 5B) | Case 6 (FIGS. 5A, 5B for reference) | Case 9 (FIGS. 5A, 5B for reference) |

Pilot 1 and Pilot 2 codes can be configured as described below, for example. In other words, as shown in Table 2, used as Pilot 1 codes are phase rotation codes E (M−1, K) with length K=8 and the number of codes M=8. Further, as shown in Table 3, used as Pilot 2 codes are Walsh codes W (N−1, R) with length Q=8 and the number of codes N=8. Furthermore, as shown in Table 4, ANT_g can be represented by combinations of Pilots 1, 2.

TABLE 2

| RAU_i | Phase Rotation Codes | Code Configuration |
|---|---|---|
| 1 | E(0, 8) | (1, 1, 1, 1, 1, 1, 1, 1)exp(0(−2π/8)) |
| 2 | E(1, 8) | (1, 1, 1, 1, 1, 1, 1, 1)exp(1(−2π/8)) |
| 3 | E(2, 8) | (1, 1, 1, 1, 1, 1, 1, 1)exp(2(−2π/8)) |
| 4 | E(3, 8) | (1, 1, 1, 1, 1, 1, 1, 1)exp(3(−2π/8)) |
| 5 | E(4, 8) | (1, 1, 1, 1, 1, 1, 1, 1)exp(4(−2π/8)) |
| 6 | E(5, 8) | (1, 1, 1, 1, 1, 1, 1, 1)exp(5(−2π/8)) |
| 7 | E(6, 8) | (1, 1, 1, 1, 1, 1, 1, 1)exp(6(−2π/8)) |
| 8 | E(7, 8) | (1, 1, 1, 1, 1, 1, 1, 1)exp(7(−2π/8)) |

TABLE 3

| BS_j | Walsh codes | Code configuration |
|---|---|---|
| 1 | W(0, 8) | 1, 1, 1, 1, 1, 1, 1, 1 |
| 2 | W(1, 8) | 1, −1, 1, −1, 1, −1, 1, −1 |
| 3 | W(2, 8) | 1, 1, −1, −1, 1, 1, −1, −1 |
| 4 | W(3, 8) | 1, −1, −1, 1, 1, −1, −1, 1 |
| 5 | W(4, 8) | 1, 1, 1, 1, −1, −1, −1, −1 |
| 6 | W(5, 8) | 1, −1, 1, −1, 1, −1, 1, −1 |
| 7 | W(6, 8) | 1, 1, −1, −1, −1, −1, 1, 1 |
| 8 | W(7, 8) | 1, −1, −1, 1, 1, −1, −1, 1 |

TABLE 4

| ANT_g | BS_j | RAU_i | Pilot2_n | Pilot2 Code | Pilot1_m | Pilot1 Code |
|---|---|---|---|---|---|---|
| 1 | 1 | 1 | 1 | W(0, 8) | 1 | E(0, 8) |
| 2 | 1 | 2 | 1 | W(0, 8) | 2 | E(1, 8) |
| 3 | 1 | 3 | 1 | W(0, 8) | 3 | E(2, 8) |
| 4 | 1 | 4 | 1 | W(0, 8) | 4 | E(3, 8) |
| 5 | 1 | 5 | 1 | W(0, 8) | 5 | E(4, 8) |
| 6 | 1 | 6 | 1 | W(0, 8) | 6 | E(5, 8) |
| 7 | 1 | 7 | 1 | W(0, 8) | 7 | E(6, 8) |
| 8 | 1 | 8 | 1 | W(0, 8) | 8 | E(7, 8) |
| 9 | 2 | 1 | 2 | W(1, 8) | 1 | E(0, 8) |
| 10 | 2 | 2 | 2 | W(1, 8) | 2 | E(1, 8) |
| 11 | 2 | 3 | 2 | W(1, 8) | 3 | E(2, 8) |
| 12 | 2 | 4 | 2 | W(1, 8) | 4 | E(3, 8) |
| 13 | 2 | 5 | 2 | W(1, 8) | 5 | E(4, 8) |
| 14 | 2 | 6 | 2 | W(1, 8) | 6 | E(5, 8) |
| 15 | 2 | 7 | 2 | W(1, 8) | 7 | E(6, 8) |
| 16 | 2 | 8 | 2 | W(1, 8) | 8 | E(7, 8) |
| 17 | 3 | 1 | 3 | W(2, 8) | 1 | E(0, 8) |
| 18 | 3 | 2 | 3 | W(2, 8) | 2 | E(1, 8) |
| ... | | | | | | |
| 57 | 8 | 1 | 8 | W(7, 8) | 1 | E(0, 8) |
| 58 | 8 | 2 | 8 | W(7, 8) | 2 | E(1, 8) |
| 59 | 8 | 3 | 8 | W(7, 8) | 3 | E(2, 8) |
| 60 | 8 | 4 | 8 | W(7, 8) | 4 | E(3, 8) |
| 61 | 8 | 5 | 8 | W(7, 8) | 5 | E(4, 8) |
| 62 | 8 | 6 | 8 | W(7, 8) | 6 | E(5, 8) |
| 63 | 8 | 7 | 8 | W(7, 8) | 7 | E(6, 8) |
| 64 | 8 | 8 | 8 | W(7, 8) | 8 | E(7, 8) |

Each signal bit of Pilots 1, 2 codes is capable of corresponding to sub-carriers occupied by Pilots 1, 2 codes shown in FIGS. 3A and 3B, FIGS. 4A and 4B and FIGS. 5A and 5B. The numbers P, R of codes may be higher than the maximum number (8 in the case of Tables 2 and 3) of codes of the codes. Further, correspondence relationships between Pilot 1_m and Pilot 2_n in RAU_i and BS_j may be indicated by other mathematical expressions and/or other tables. Furthermore, in order to reduce interference between RAUs, Pilot 2 may undergo scrambling processing using scrambling codes associated with BS_j. Moreover, Pilot 1 may undergo scrambling processing using scrambling codes associated with RAU_i.

Thus, by allocating a different Pilot 1 to each RAU belonging to a BS, while allocating the same Pilot 2 to each RAU belonging to the BS, it is possible to reduce PiCH interference between different RAUs belonging to the same BS and between same RAUs belonging to different BSs, and to improve radio propagation path estimation accuracy between the MS and each antenna.

Figure 8:
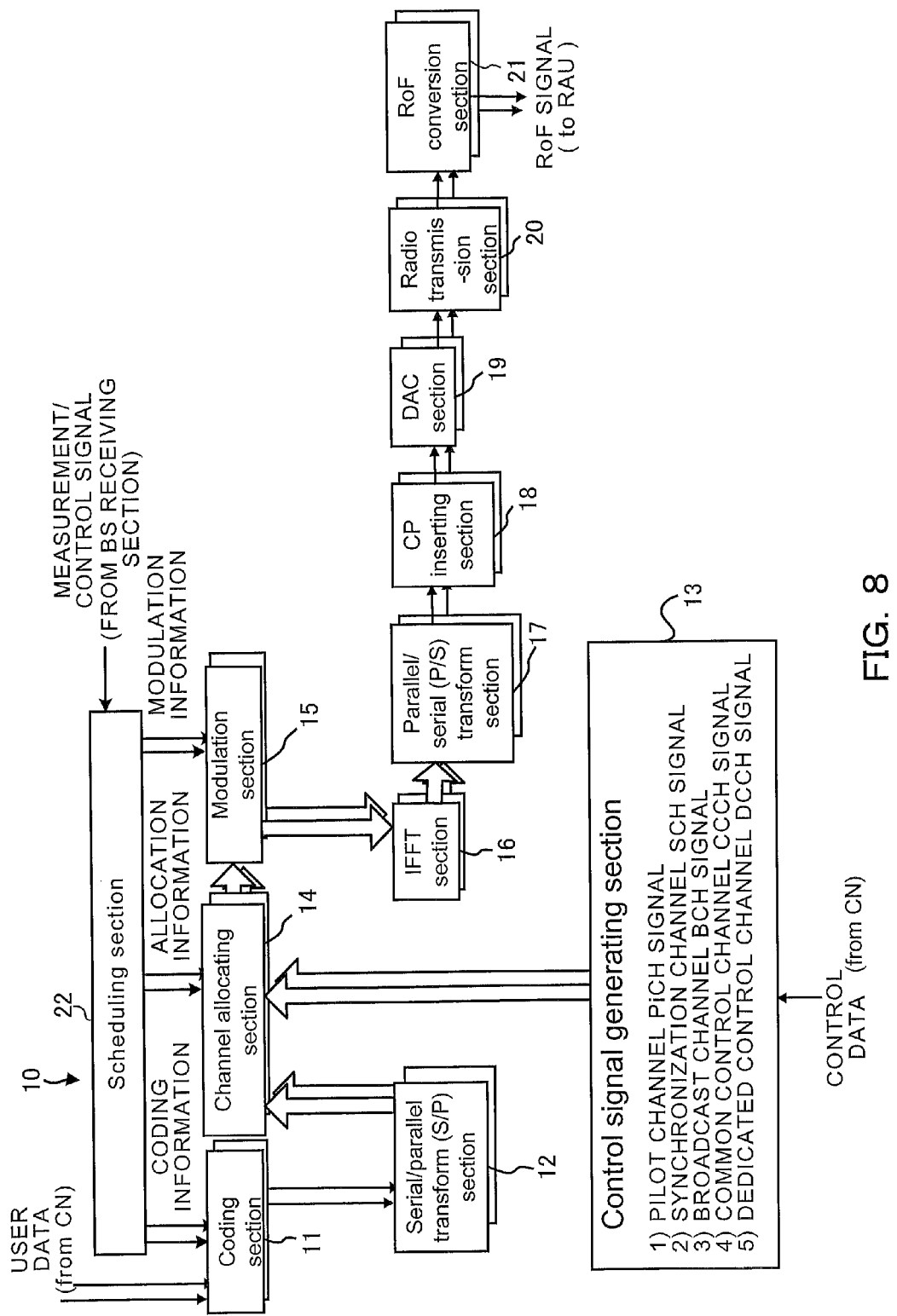
FIG. 8 is a diagram illustrating a configuration of a transmitting section of a BS based on an OFDMA communication system.

A configuration of a BS will be described below. FIG. 8 is a diagram illustrating a configuration of a transmitting section of a BS based on the OFDMA communication system. A BS 10 is comprised of a coding section 11, serial/parallel transform (S/P) section 12, control signal generating section 13, channel allocating section 14, modulation section 15, IFFT (Inverse Fast Fourier Transform) section 16, parallel/serial (P/S) transform section 17, CP (Cyclic Prefix) inserting section 18, digital/analog signal conversion (DAC) section 19, radio transmission section 20, RoF conversion section 21, and scheduling section 22.

The control signal generating section 13 generates a PiCH signal (including Pilots 1, 2), SCH signal (including SCH 1, SCH 2), broadcast channel BCH signal, common control channel CCCH signal, and dedicated control channel DCCH signal based on control data such as the RAU number, BS number and antenna number input from the CN, and outputs the signals to the channel allocating section 14.

The channel allocating section 14 allocates the PiCH signal, SCH signal, broadcast channel BCH signal, common control channel CCCH signal and dedicated control channel DCCH signal from the control signal generating section 13 and user data from the parallel/serial transform (P/S) section 12 to a predetermined radio frame, sub-carriers and OFDM symbols.

The scheduling control section 22 receives measurement/control signals generated based on feedback information, antenna selection/measurement information, etc. of an MS received in a receiving section (not shown) of the BS. The scheduling control section 22 selects a radio resource block (comprised of a plurality of sub-carriers and slots) suitable for each MS according to radio propagation path conditions between the MS and each RAU, outputs coding information such as a coding scheme and rate to the coding section 11, outputs modulation information such as BPSK and QPSK to the modulation section 15, and outputs radio resource allocation information such as a radio resource block number to the channel allocating section 14.

The user data from the CN is selected using the measurement/control signals generated based on feedback information, antenna selection/measurement information, etc. of the MS received in the BS, and is input to the coding section 11 corresponding to a respective RAU. The coding section 11 performs coding on the user data using a predetermined coding scheme and rate according to the coding information to output to the serial/parallel transform (S/P) section 12. The signal of transformed parallel user data is input to the channel allocating section 14. The channel allocating section 14 allocates the user data using the radio resource allocation information to output to the modulation section 15. The modulation section 15 modulates the user data using the modulation information, and further, the IFFT section 16 generates an OFDM signal. The generated OFDM signal is input to the radio transmission section 20 through the parallel/serial (P/S) transform section 17, CP (Cyclic Prefix) inserting section 18, and digital/analog signal conversion (DAC) section 19.

The radio transmission section 20 performs filtering processing, frequency conversion, etc. on the OFDM signal, and the RoF conversion section 21 transmits the OFDM signal to the RAU as an optical signal. In addition, FIG. 8 shows an example that a single BS has two RAU transmitting sections, but two or more sections may be used.

A PiCH transmission signal from each antenna can be generated by the control signal generating section 13 generating Pilots 1, 2 codes as shown in Table 2 or 3, for example, and the channel allocating section 14 generating a configuration as shown in FIGS. 3A to 5B. As shown in FIGS. 3A to 5B, a Pilot 2 code bit corresponds to each sub-carrier, but can also be inserted as a time signal in an input end of the parallel/serial transform (P/S) section 17 as shown in FIG. 8.

(Embodiment 2)

It is a basic concept of Embodiment 2 of the invention to associate a code number of the SCH 2 with a BS number so as to configure the SCH. In above-mentioned Embodiment 1, Pilot 1_m code is assigned to RAU number RAU_i (i=1, 2, 3, . . . , I), Pilot 2_n code is assigned to BS number BS_j (j=1, 2, 3, . . . , J), and antenna number ANT_g (g=1, 2, 3, . . . , G) is expressed by G=I×J.

A configuration of the SCH according to this Embodiment will be described below. The SCH inserted in a downlink radio frame is used for initial synchronization of OFDM reception signal, antenna selection and the like. The SCH contains SCH 1 and SCH 2. The SCH 1 includes information such as carrier frequency offset synchronization and OFDM symbol timing synchronization. The SCH 2 includes ANT_g related information, frequency bandwidth of a broadcast channel BCH dependent on a system bandwidth specific to a BS, transmission diversity scheme, RAU maximum transmit power, PiCH transmit power, transmission signal configuration of an RAU and/or BS such as radio frame timing, and physical number PH_w (w=1, 2, . . . , W) that is physical configuration information related to a physical configuration such as a hardware configuration.

As a method of multiplexing the SCH 1 and SCH 2, it is possible to adopt CDM, TDM and FDM. As in PiCH codes, it is possible to assign SCH 1 codes and SCH 2 codes to the SCH 1 and SCH 2 using various codes (such as, for example, random codes, orthogonal codes and phase rotation codes). When the SCH 2 codes are sufficiently long (i.e. the number of codes is high), it is possible to directly carry ANT_g. However, when reductions in overhead of the SCH are required, the code length, transmission time, transmission frequency bandwidth or the like is limited, or consideration is given to initial synchronization, antenna selection characteristics (detection time, detection probability, etc.), complexity in the MS and power consumption, it is required to consider transmission methods of ANT_g and PH_w on the SCH.

Figure 9A:
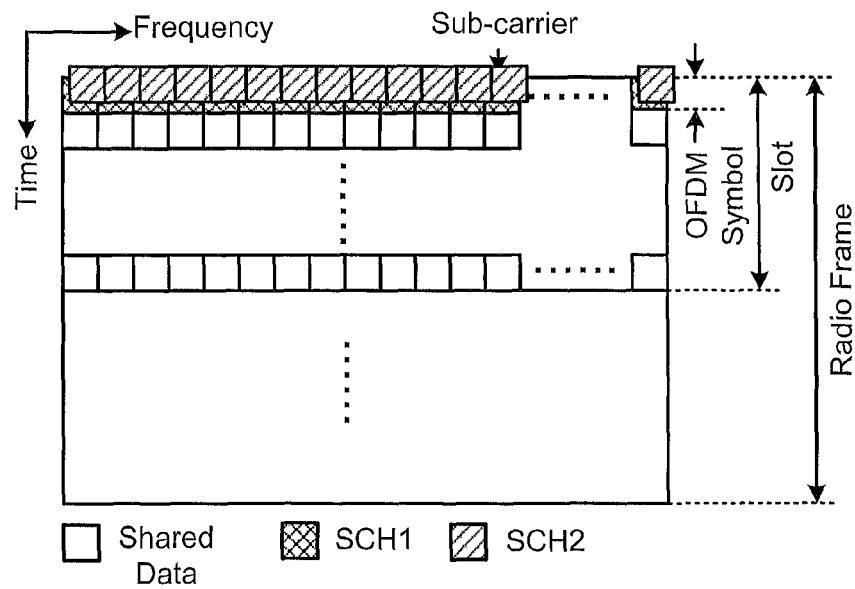
FIG. 9A is a diagram illustrating code multiple of SCH 1 and SCH 2 signals.
Figure 9B:
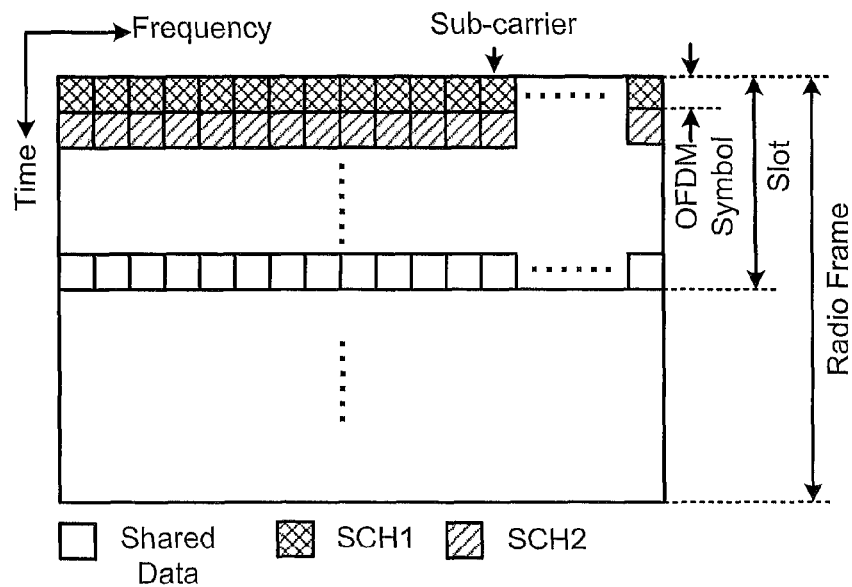
FIG. 9B is a diagram illustrating time multiple of SCH 1 and SCH 2 signals.
Figure 10:
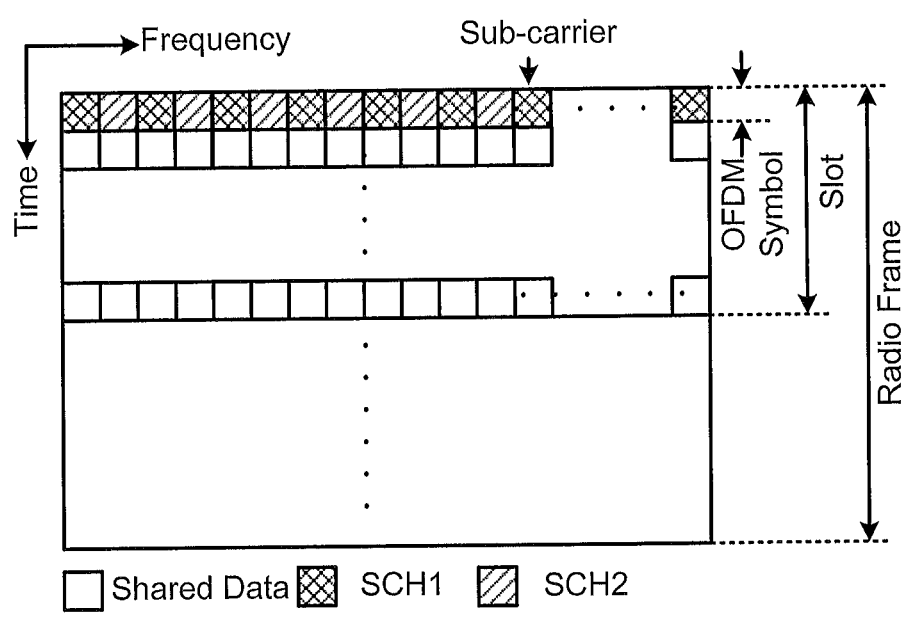
FIG. 10 is a diagram illustrating frequency multiple of SCH 1 and SCH 2 signals.

FIGS. 9A, 9B and 10 are diagrams showing examples of a method of multiplexing the SCH 1 and SCH 2 based on the OFDMA communication system. FIGS. 9A, 9B and 10 respectively show CDM, TDM and FDM of SCH 1 and SCH 2 signals.

Figure 11:
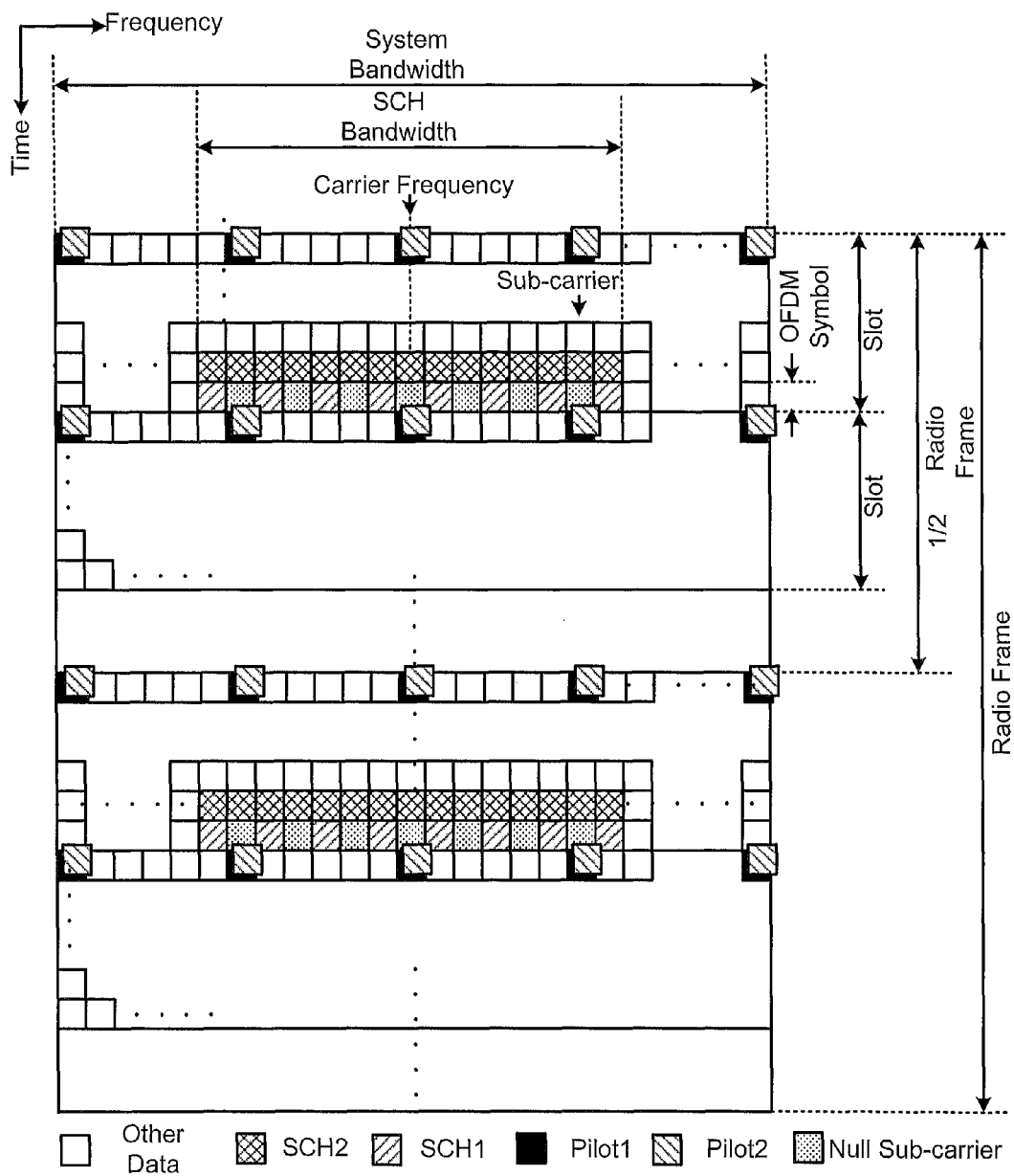
FIG. 11 is a diagram illustrating code multiple of Pilots 1, 2 and time multiple of SCH 1 and SCH 2 signals based on the OFDMA communication system.

As a specific example, FIG. 11 shows CDM of Pilots 1, 2 codes and TDM of SCH 1 and SCH 2 signals based on the OFDMA communication system. Pilots 1, 2 codes in FIG. 11 are assigned codes as shown in Tables 2 and 3. A single radio frame includes two SCHs, and when the radio frame is divided into ½ divided frames, the SCH 1 is allocated to a last OFDM symbol in the first slot of each divided frame. Further, the SCH 2 is allocated to an OFDM symbol immediately before the SCH 1. The SCH 1 and SCH 2 may be allocated to another slot in a radio slot, or another OFDM symbols in the slot.

In FIG. 11, the SCH bandwidth is smaller than the system bandwidth that is a transmission frequency bandwidth of the BS. For example, the system bandwidth is 10 MHz, 100 MHz or the like, and the SCH bandwidth is 1.25 MHz, 5 MHz or the like. Further, FIG. 11 shows symmetric allocation with the carrier frequency of 4 GHz being the center, for example. In order to obtain a repetition waveform in the time domain, the SCH 1 is allocated every two sub-carriers, and a null sub-carrier is inserted in a subcarrier between SCHs 1. In addition, the SCH 1 may be allocated to each sub-carrier continuously.

As in Pilot codes, various codes (such as, for example, random codes, orthogonal codes, phase rotation codes) can be used for the SCH 1 and SCH 2. An SCH 1 code number and SCH 2 code number are assumed to be respectively SCH 1_x (x=1, 2, 3, . . . , X) and SCH 2_y (y=1, 2, 3, . . . , Y). In this Embodiment, all the RAUs are assigned a single SCH 1_1 that is a common SCH 1 signal, and a carrier frequency offset and OFDM symbol timing is detected by auto-correlation of the repetition waveform in the time domain. SCH 2 codes that are SCH 2 signals of different BSs are assigned GCL (Generalized Chirp Like) codes with different GCL numbers. GCL codes S can be expressed by Equation (1).

[Eq. 1]

$$s_u(k) = \exp\left\{-j2\pi u \frac{k(k+1)}{2N_G}\right\}, k = 0 \wedge N_G - 1, \text{ and } u = 1 \wedge N_G - 1 \quad (1)$$

where $N_G$ is the length of GCL codes and a prime number, and u represents a GCL number. In other words, GCL codes with the length $N_G$ have $N_G-1$ numbers (kinds of GCL codes). Each sub-carrier of the SCH 2 in FIG. 11 corresponds to each GCL code element (k). Herein, a GCL number u that is of SCH 2_y is associated with a combination of PH_w and BS_j. For example, when W=2 and J=8, the relationship of the GCL number n, PH_w and BS_j is expressed as shown in Table 5. When there is no information of PH_w, i.e. W=0, SCH 2_y is associated with BS_j in a one-to-one relationship. Further, to reduce interference between RAUs, the SCH 2 may undergo scrambling processing using scrambling codes associated with SCH 1_x.

TABLE 5

| SCH2_y | GCL Number u | PH_w | BS_j |
|---|---|---|---|
| 1 | 1 | 1 | 1 |
| 2 | 2 |  | 2 |
| 3 | 3 |  | 3 |
| 4 | 4 |  | 4 |
| 5 | 5 |  | 5 |
| 6 | 6 |  | 6 |
| 7 | 7 |  | 7 |
| 8 | 8 |  | 8 |
| 9 | 9 | 2 | 1 |
| 10 | 10 |  | 2 |
| 11 | 11 |  | 3 |
| 12 | 12 |  | 4 |
| 13 | 13 |  | 5 |
| 14 | 14 |  | 6 |
| 15 | 15 |  | 7 |
| 16 | 16 |  | 8 |

Figure 12:
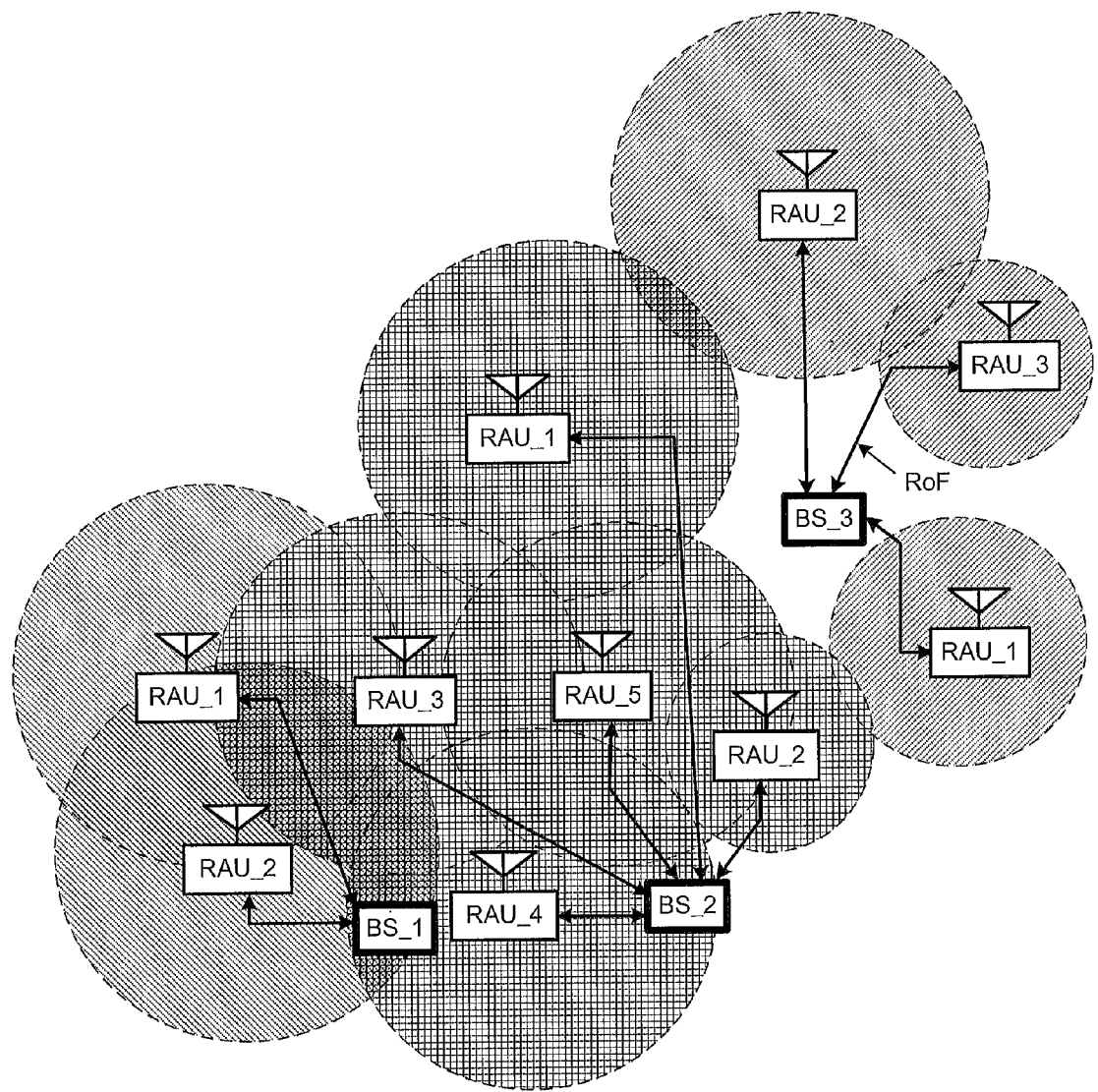
FIG. 12 is a diagram illustrating a concept of Embodiment 2.

FIG. 12 is a diagram illustrating the concept of Embodiment 2. RAUs under each BS transmit the same SCH 2. For example, in FIG. 12, the SCH 2 transmitted from RAU_1 and RAU_2 under BS_1 is shown by the right-downward oblique lines, the SCH 2 transmitted from RAU_1 to RAU_5 under BS_2 is shown by vertical-horizontal shading, and the SCH 2 transmitted from RAU_1 to RAU_3 under BS_3 is shown by the right-upward oblique lines.

A configuration of a transmitting section of the BS is the same as the configuration as shown in FIG. 8. The SCH 2 transmission signal from each antenna is generated in the control signal generating section 13. For example, the control signal generating section 13 generates GCL codes in Table 5, and the channel allocating section 14 is capable of allocating the codes in the configuration as shown in FIG. 11.

(Embodiment 3)

It is a basic concept of Embodiment 3 of the invention to associate a code number of the SCH 1 with an RAU number so as to configure the SCH. In above-mentioned Embodiments 1 and 2, Pilot 1_m code is assigned to RAU number RAU_i (i=1, 2, 3, . . . , I), Pilot 2_n code is assigned to BS number BS_j (j=1, 2, 3, . . . , J), and antenna number ANT_g (g=1, 2, 3 . . . , G) is expressed by G=I×J. Further, SCH 2 number SCH 2_y is associated with BS number BS_i, and the SCH is configured.

A configuration of the SCH 1 according to this Embodiment is described below. As shown in FIG. 11, a carrier frequency offset and OFDM symbol timing is detected by auto-correlation of the repetition waveform in the time domain of the SCH 1 signal, and RAU_i (i=1, 2, 3, . . . , I) associated with SCH 1 code number SCH1_x (x=1, 2, 3, . . . , X) is detected by cross-correlation with the SCH 1 signal.

As in Pilots 1, 2 codes, various codes (such as, for example, random codes, orthogonal codes, phase rotation codes) can be used for the SCH 1, and SCH 1_x is associated with RAU_i that is an RAU number.

Figure 13:
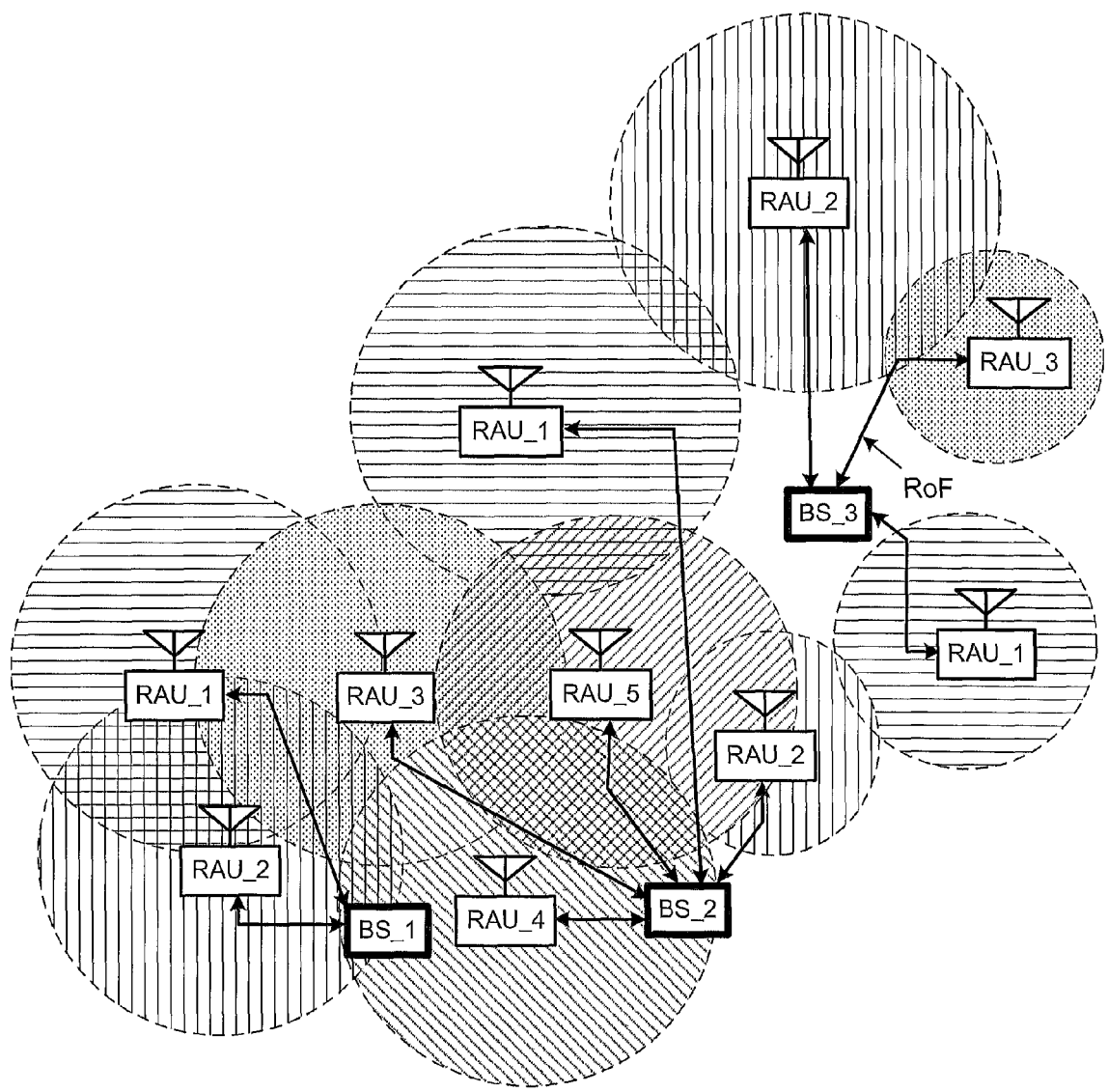
FIG. 13 is a diagram illustrating a concept of Embodiment 3 where RAUs belonging to each BS transmit different SCHs 1.

FIG. 13 is a diagram illustrating the concept of Embodiment 3, where RAUs belonging to each BS transmit different SCHs 1. As shown in FIG. 13, GCL codes having different GCL numbers u are assigned to different SCH 1 codes. Herein, a GCL number u that is of SCH 1_x is associated with RAU_i. For example, in the case of RAUs (I=8), the relationship between the GCL number u and RAU_i can be expressed as shown in Table 6. SCH 1_x is associated with RAU_i in a one-to-one relationship.

TABLE 6

| SCH1_x | GCL Number u | RAU_i |
|---|---|---|
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 7 | 7 |
| 8 | 8 | 8 |

A configuration of a transmitting section of the BS is the same as that in FIG. 8. The SCH 1 transmission signal from each antenna is generated in the control signal generating section 13. For example, the control signal generating section 13 generates GCL codes in Table 6, and the channel allocating section 14 is capable of allocating as shown in FIG. 11.

(Embodiment 4)

Embodiment 4 of the invention is an antenna selection method corresponding to configurations of PiCH and SCH signals according to Embodiments 1 and 2. In Embodiments 1 and 2, Pilot 1_m code is assigned to RAU number RAU_i (i=1, 2, 3, . . . , I), Pilot 2_n code is assigned to BS number BS_j (j=1, 2, 3, . . . , J), and antenna number ANT_g (g=1, 2, 3 . . . , G) is expressed by G=I×J. Further, SCH 2 number SCH 2_y is associated with BS number BS_i, and the SCH is configured.

Figure 14:
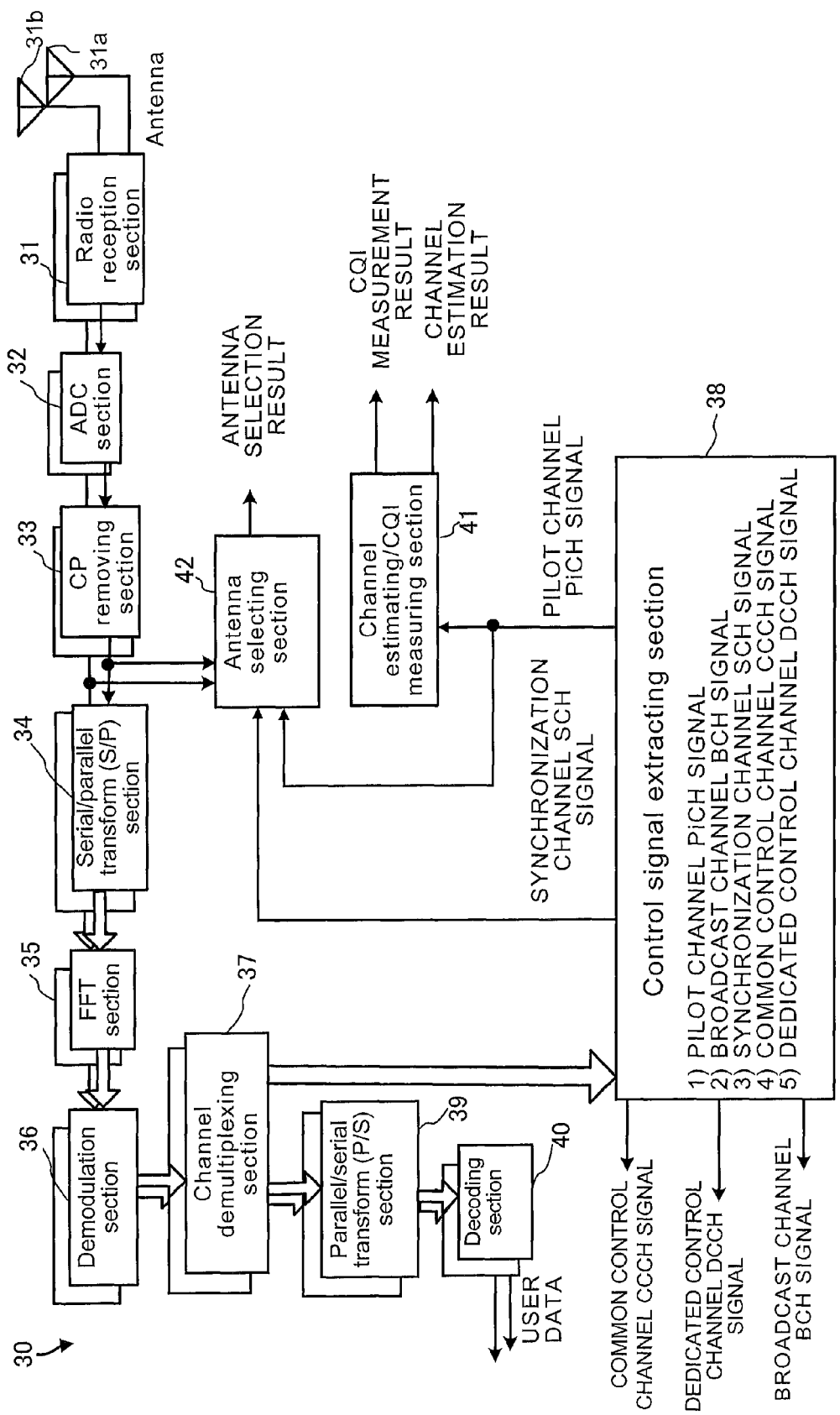
FIG. 14 is a diagram illustrating a configuration of a receiving section of an MS based on the OFDMA communication system.

A configuration of an MS will be described below. FIG. 14 is a diagram illustrating a configuration of a receiving section of an MS based on the OFDMA communication system. An MS 30 is comprised of a radio reception section 32 having antennas 31a, 31b, analog/digital signal conversion (ADC) section 32, CP removing section 33, serial/parallel transform (S/P) section 34, FFT (Fast Fourier Transform) section 35, demodulation section 36, channel demultiplexing section 37, control signal extracting section 38, parallel/serial transform (P/S) section 39, decoding section 40, channel estimating/CQI (Channel Quality Indicator) measuring section 41, and antenna selecting section 42. FIG. 14 shows the configuration of a MIMO receiver having two antennas, but the MS may have antennas more than two.

A radio signal from each RAU is input to the radio reception section 31 through the antennas 31a and 31b, subjected to processing such as frequency conversion and filtering in the radio reception section 31, thereby converted into a baseband signal, and output to the analog/digital signal conversion (ADC) section 32. The CP removing section 33, serial/parallel transform (S/P) section 34, FFT section 35, and demodulation section 36 perform, on the signal, processing inverse to the processing in the CP inserting section 18, parallel/serial transform (P/S) section 17, IFFT section 16 and modulation section 15 of the BS transmitting section, and the demodulated OFDM signal is input to the channel demultiplexing section 37.

The channel demultiplexing section 37 demultiplexes a PiCH signal, SCH signal, broadcast channel BCH signal, common control channel CCCH signal and dedicated control channel DCCH signal from a predetermined radio frame, sub-carriers and OFDM symbols, and outputs a control signal to the control signal extracting section 38, and user data to the parallel/serial transform (P/S) section 39.

The control signal extracting section 38 extracts a PiCH signal (multiplexed signal from a plurality of antennas) including Pilots 1, 2 codes from the PiCH arrangement as shown in Table 1 based on an input signal from the channel demultiplexing section 37 to output to the channel estimating/ CQI measuring section 41 and antenna selecting section 42. Further, the section 38 extracts an SCH signal (multiplexed signal from a plurality of antennas) including SCH 1 and SCH 2 codes from the SCH arrangement as shown in FIG. 11 to output to the antenna selecting section 42. Furthermore, the section 38 extracts the BCH, CCCH and DCCH to output to a control section (not shown) of the MS.

The antenna selecting section 42 performs antenna selection for identifying a frequency carrier offset of the OFDM signal, OFDM symbol timing, radio frame timing and antenna number ANT_g using the PiCH signal and SCH signal. The section 42 outputs the frequency carrier offset, OFDM symbol timing, radio frame timing and antenna number ANT_g information that are results of antenna selection to the control section of the MS so as to perform control of the MS and report to the BS. The MS forms a virtual cell VC of the MS under the control of the BS.

The channel estimating/CQI measuring section 41 performs radio propagation path estimation and CQI measurement between antennas of a plurality of RAUs and the MS constituting the virtual cell VC using control information such as the antenna selection results from the control section of the MS and PiCH signal. The section 41 outputs the channel estimation result and CQI measurement result to the control section of the MS, the demodulation section 36 performs coherent detection of the reception signal using the channel estimation result, and a transmitting section (not shown) of the MS transmits the CQI measurement result to the BS as feedback.

Figure 15:
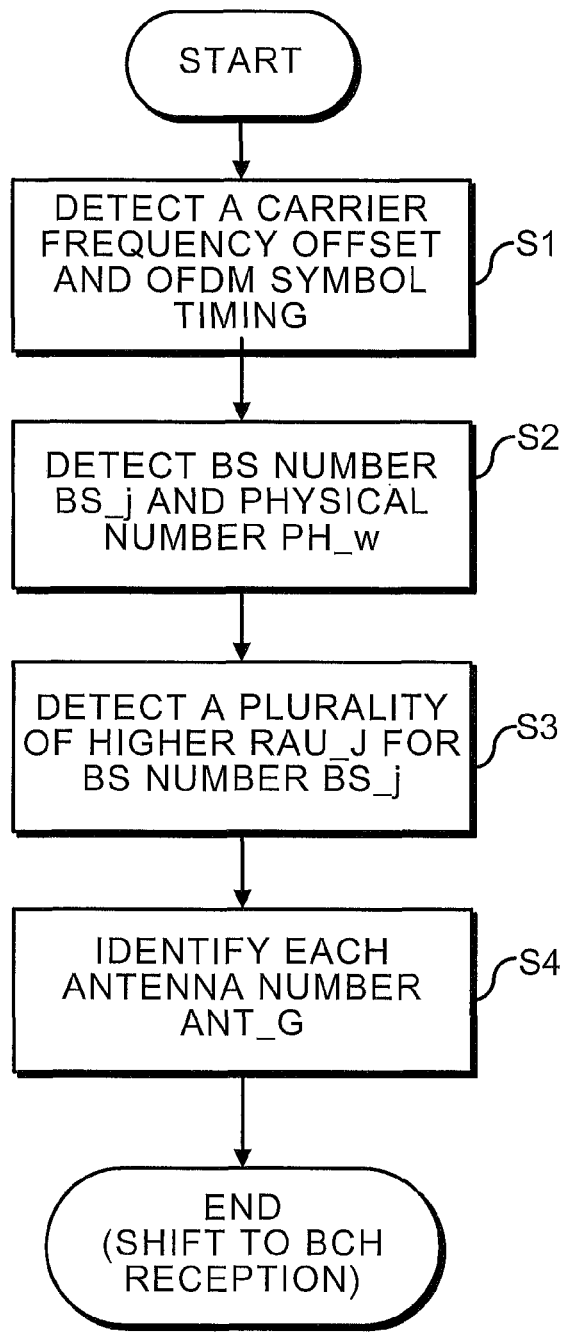
FIG. 15 is a flowchart illustrating an antenna selection method corresponding to configurations of PiCH and SCH signals according to Embodiments 1 and 2.

FIG. 15 is a flowchart illustrating an antenna selection method corresponding to configurations of PiCH and SCH signals according to Embodiments 1 and 2. First, in step S1, the antenna selecting section 42 generates SCH 1 codes common in the system that are local replica signals, performs cross-correlation processing in the time domain on an SCH multiplexed signal (reception signal) from RAUs with the CP removed using the SCH 1 codes common in the system, and detects a carrier frequency offset and OFDM symbol timing on the SCH 1 with the maximum cross-correlation value.

Next, in step S2, the section 42 detects BS number BS_j and physical number PH_w with the maximum reception power from the SCH multiplexed signal from the control signal extracting section 38. As a specific method, the antenna selecting section 42 generates Y SCH 2 codes that are local replica signals to perform cross-correlation processing with the received SCH 2 multiplexed signal. For example, in radio-signal environments of the MS 1 as shown in FIGS. 1, 2 and 16A to 16C, the section 42 is capable of detecting SCH 2_3 with the maximum cross-correlation value from cross-correlation values with sixteen SCH 2 codes, and further detecting PH_1 and BS_3 as shown in Table 5.

In step S3, the section 42 identifies A RAU numbers RAU_i (i=1, 2, 3, . . . , I) in descending order of the reception power for BS_j detected in step S2 from the PiCH multiplexed signal from the control signal extracting section 38. As a specific method, the antenna selecting section 42 generates a Pilot 2 code that is a local replica of code number Pilot 2_n of the Pilot 2 corresponding to BS_j using BS number BS_j detected in step S2. For example, as shown in 16A, since BS_3 is detected, the section 42 generates W(2,8) that is Pilot 2_3 as shown in Table 4. In the cases 1, 2, and 3 shown in Table 1, according to the multiplexing method of Pilots 1, 2 codes between RAUs as shown in FIGS. 3A to 5B, the section 42 removes Pilot 2 code components by despreading processing, and divides a multiplexed signal (reception signal) of the Pilot 1 from the PiCH multiplexed signal. Further, the section 42 generates M Pilot 1 signals that are local signals to perform cross-correlation processing on the divided multiplexed signal of the Pilot 1.

Figure 16A:
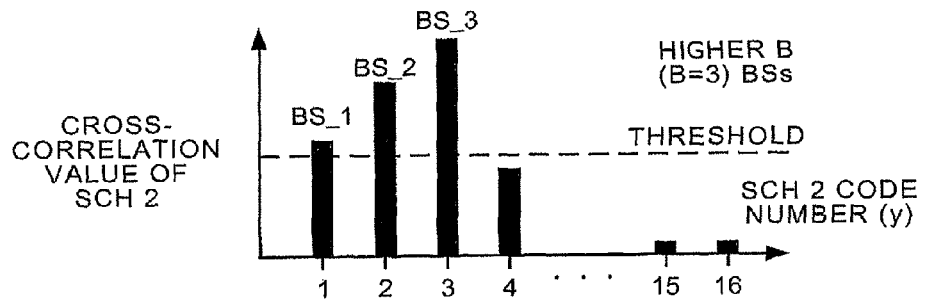
FIG. 16A is a diagram illustrating the relationship between the code number of the SCH 2 and cross-correlation value of the SCH.
Figure 16B:
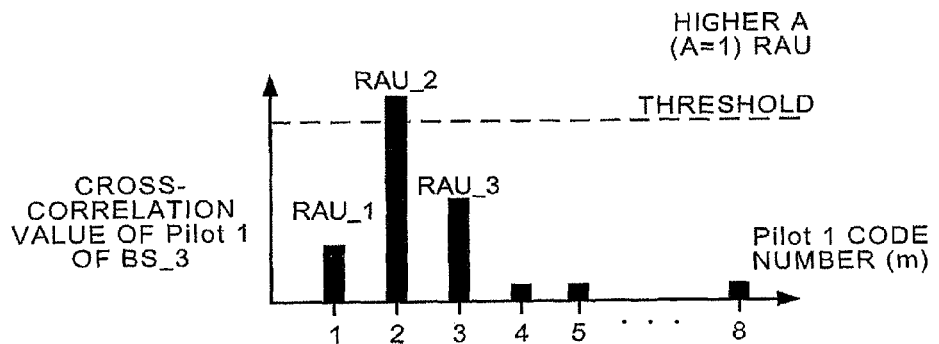
FIG. 16B is a diagram illustrating the relationship between a Pilot 1 code number and cross-correlation value of Pilot 1 of BS_3.
Figure 16C:
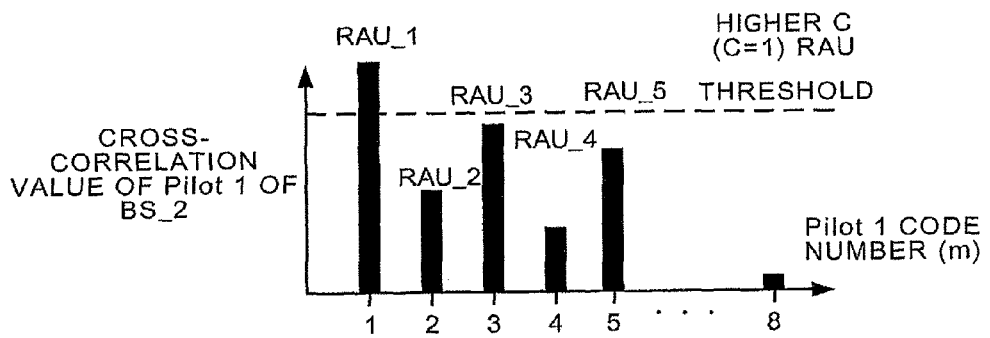
FIG. 16C is a diagram illustrating the relationship between a Pilot 1 code number and cross-correlation value of Pilot 1 of BS_2.

For example, the section 42 detects A Pilots 1 in descending order of the cross-correlation value using a threshold value from cross-correlation values of eight Pilots 1 as shown in Table 4, and is capable of detecting A RAU_i. For example, as shown in FIGS. 1, 2 and 16B, the section 42 detects RAU_2 in BS_3. Next, returning to step S1, the section 42 performs the same processing as in steps S1 to S3 (repeats on a plurality of SCHs 1 with higher values) on the SCH 1 having a second-high SCH 1 cross-correlation value directly lower than the maximum cross-correlation value. Finally, the section 42 is capable of detecting a plurality of antenna numbers ANT_g. For example, as shown in FIGS. 1, 2 and 16C, the section 42 is capable of ultimately identifying RAU_2 of BS_3 and RAU_1 of BS_2.

In step S4, the section 42 identifies antenna numbers ANT_g using RAU_i and BS_j detected in steps 2 and 3. For example, when the section 42 detects RAU_2 of BS_3 and RAU_1 of BS_2, the section 42 is capable of identifying antenna numbers ANT_9, 18 from Table 4.

Figure 18:
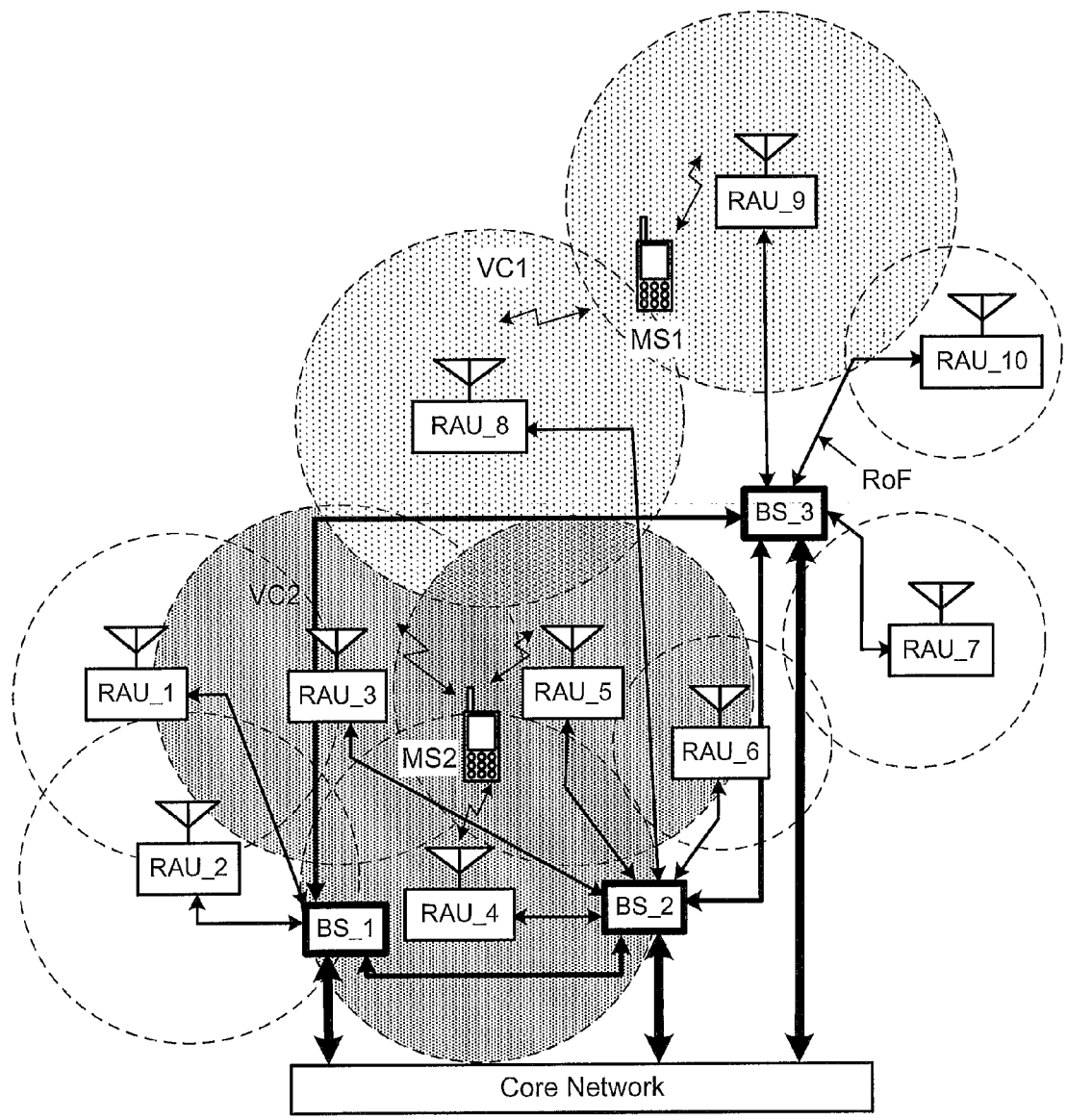
FIG. 18 is a diagram showing a configuration outline of the DWCS.

Thus, by the antenna selection method as shown in FIG. 15, based on certain detection criteria, for example, using threshold values 1,2,3 in FIGS. 16A to 16C and cross-correlation value correction described later, it is possible to detect a plurality of antenna numbers ANT_g. It is possible to detect total p (p=1, 2, 3, . . . , P, p is related to A, B, C values) antennas in descending order of the reception power level including a plurality of BSs to select. According to such an antenna selection method, it is possible to select a plurality of antennas to form a VC, and to switch between VCs by moving of the MS. For example, as shown in FIG. 18, the MS 1 reports ANT_9,18 to the BS, and is able to form the VS. Further, the MS may report a plurality of higher cross-correlation values as in FIGS. 16A to 16C to the BS so that a VC can be configured by the BS.

When each RAU has different maximum transmit power of the RAU, the correction can be made to the cross-correlation value in steps S2 and S3 using the maximum transmit power information of the RAU included in physical number PH_w detected in step S2. As a specific method, set are $2^{Np}$ levels enabling the maximum transmit power of an RAU to be represented by Np bits. Each RAU includes Np-bit information of the maximum transmit power level in physical number PH_w to transmit on the SCH 2. In step S2, the antenna selecting section 42 generates Y SCH 2 codes that are local replica signals to perform cross-correlation processing with a received SCH 2 multiplexed signal. Corrections are made to all the cross-correlation values using the known power level information.

Figure 19:
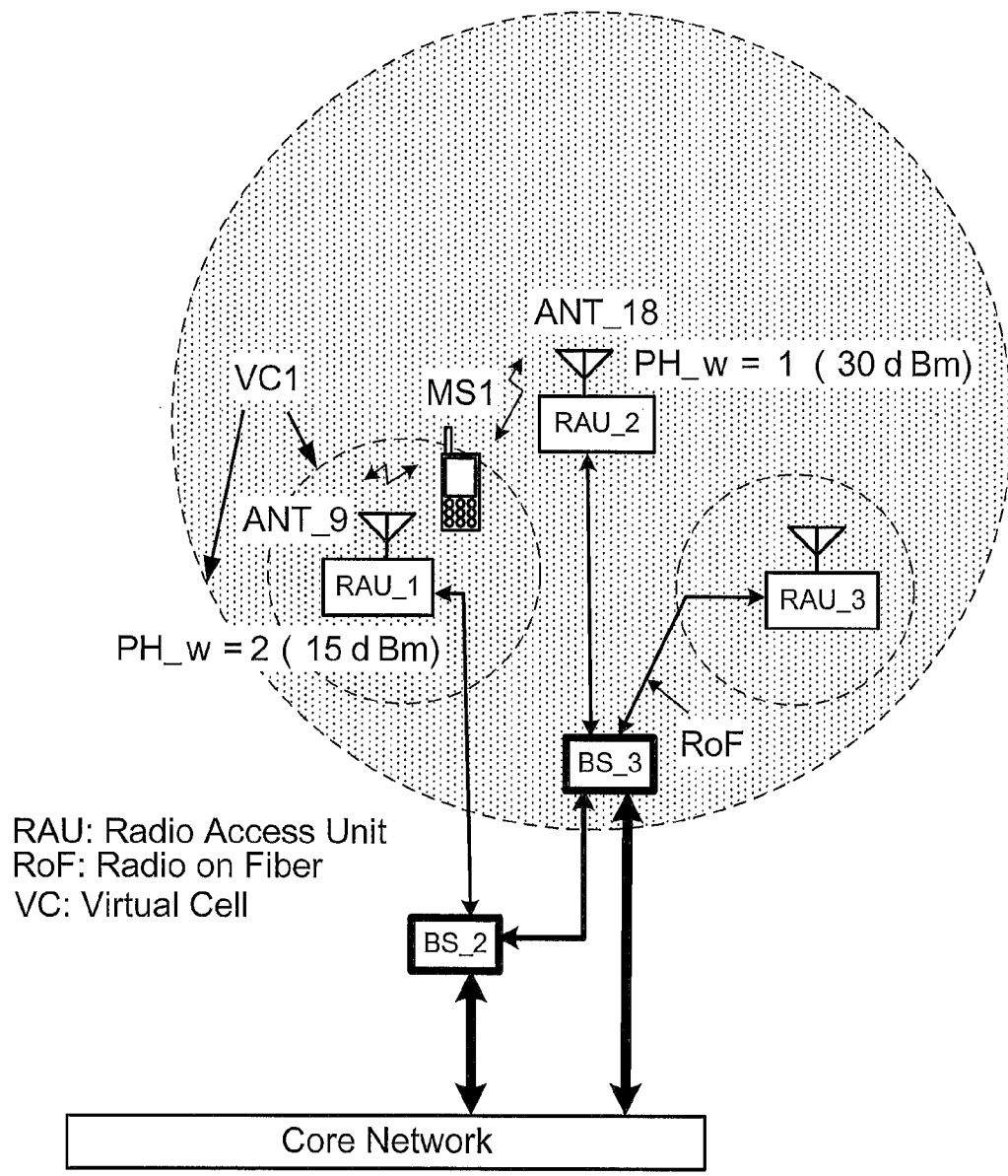
FIG. 19 is a diagram showing a configuration outline of the DWCS in which the maximum transmit power varies with RAUs.

For example, as shown in FIG. 19, when the maximum transmit power of RAU_1 of BS_2 is 15 dBm, and the maximum transmit power of RAU_2 of BS_3 is 30 dBm, the maximum transmit power level of the RAU is represented by Np=1, and is associated using PH_w (PH_w=2:15 dm, PH_w=1:30 dBm) as shown in Table 5. For cross-correlation values of sixteen SCH 2 codes obtained by the cross-correlation processing, the correction is made so as to decrease the cross-correlation value of SCH 2_3 corresponding to RAU_2 of BS_3 by 15 dB using the correspondence of known PH_w, a plurality of SCHs 2 with higher cross-correlation values is detected using a threshold value, and it is possible to detect BS_j and other PH_w (in the case of two or more bits) information respectively corresponding to the SCHs. Ultimately, it is possible to identify antenna numbers ANT_9, 18 similarly.

(Embodiment 5)

Embodiment 5 of the invention is an antenna selection method corresponding to the PiCH/SCH signal configuration of Embodiment 3. In Embodiment 3, SCH 1 code number SCH 1_x is associated with RAU_i that is an RAU number to configure the SCH. In addition, a configuration of an MS is the same as in Embodiment 4, and is omitted.

Figure 17:
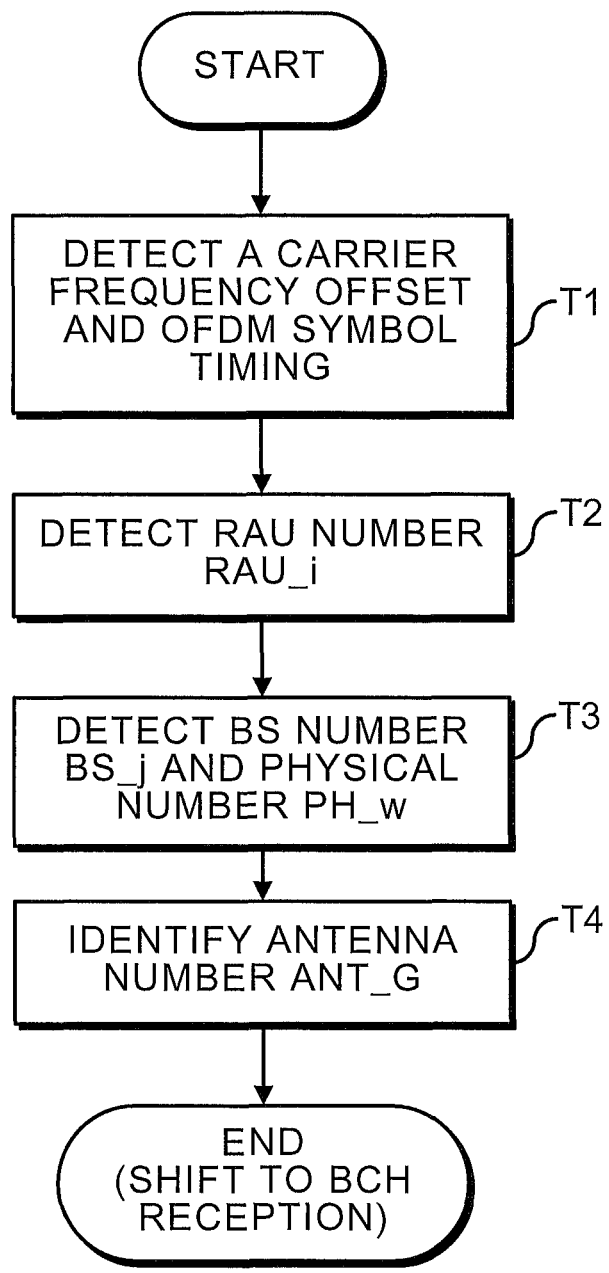
FIG. 17 is a flowchart illustrating an antenna selection method corresponding to the SCH of Embodiment 3.

FIG. 17 is a flowchart illustrating an antenna selection method corresponding to the SCH of Embodiment 3. In step T1, the antenna selecting section 42 generates X SCH 1 code numbers SCH 1_x that are local replica signals, performs cross-correlation processing in the time domain on an SCH multiplexed signal (reception signal) from RAUs with the CP removed using each SCH 1_x code, and detects a carrier frequency offset and OFDM symbol timing on the SCH 1 with the maximum cross-correlation value.

In step T2, the section 42 detects RAU number RAU_i with the maximum reception power from the SCH multiplexed signal from the control signal extracting section 38. As a specific method, the antenna selecting section 42 generates X SCH 1 codes that are local replica signals to perform cross-correlation processing with the received SCH 1 multiplexed signal. For example, in radio-signal environments of the MS 1 as shown in FIGS. 1, 2 and 16A to 16C, the section 42 is capable of detecting RAU_2 when the section 42 detects SCH 1_2 with the maximum cross-correlation value from cross-correlation values of eight SCH 1 codes as shown in Table 6.

In step T3, the section 42 detects BS number BS_j with the maximum reception power and physical number PH_w from the SCH multiplexed signal from the control signal extracting section 38. A specific method is the same as in Embodiment 4. The antenna selecting section 42 generates Y SCH 2 codes that are local replica signals to perform cross-correlation processing with the received SCH 2 multiplexed signal. For example, when the section 42 detects SCH 2_3 with the maximum cross-correlation value from cross-correlation values of sixteen SCH 2 codes as shown in Table 5, the section 42 is capable of detecting PH_1 and BS_3. Next, returning to step T1, the section 42 performs the same processing as in steps T1 to T3 (repeats on a plurality of SCHs 1 with higher values) on the SCH 1 having a second-high SCH 1 cross-correlation value directly lower than the maximum cross-correlation value. Finally, the section 42 is capable of detecting a plurality of antenna numbers ANT_g. For example, as shown in FIGS. 1, 2 and 16A to 16C, the section 42 is capable of ultimately detecting RAU_2 of BS_3 and RAU_1 of BS_2.

In step T4, the section 42 identifies antenna number ANT_g using RAU_i and BS_j detected in steps 2 and 3. A specific method is the same as in Embodiment 4. When the section 42 detects RAU_2 of BS_3 and RAU_1 of BS_2, the section 42 is capable of identifying antenna numbers ANT_9, 18 from Table 4.

Thus, by the antenna selection method as shown in FIG. 17, based on certain detection criteria, it is possible to detect a plurality of antenna numbers ANT_g. For example, it is possible to detect and select p (p=1, 2, 3, . . . , P) antennas in descending order of the reception power level. According to such an antenna selection method, it is possible to select a plurality of antennas to form a VC.

Figure 20:
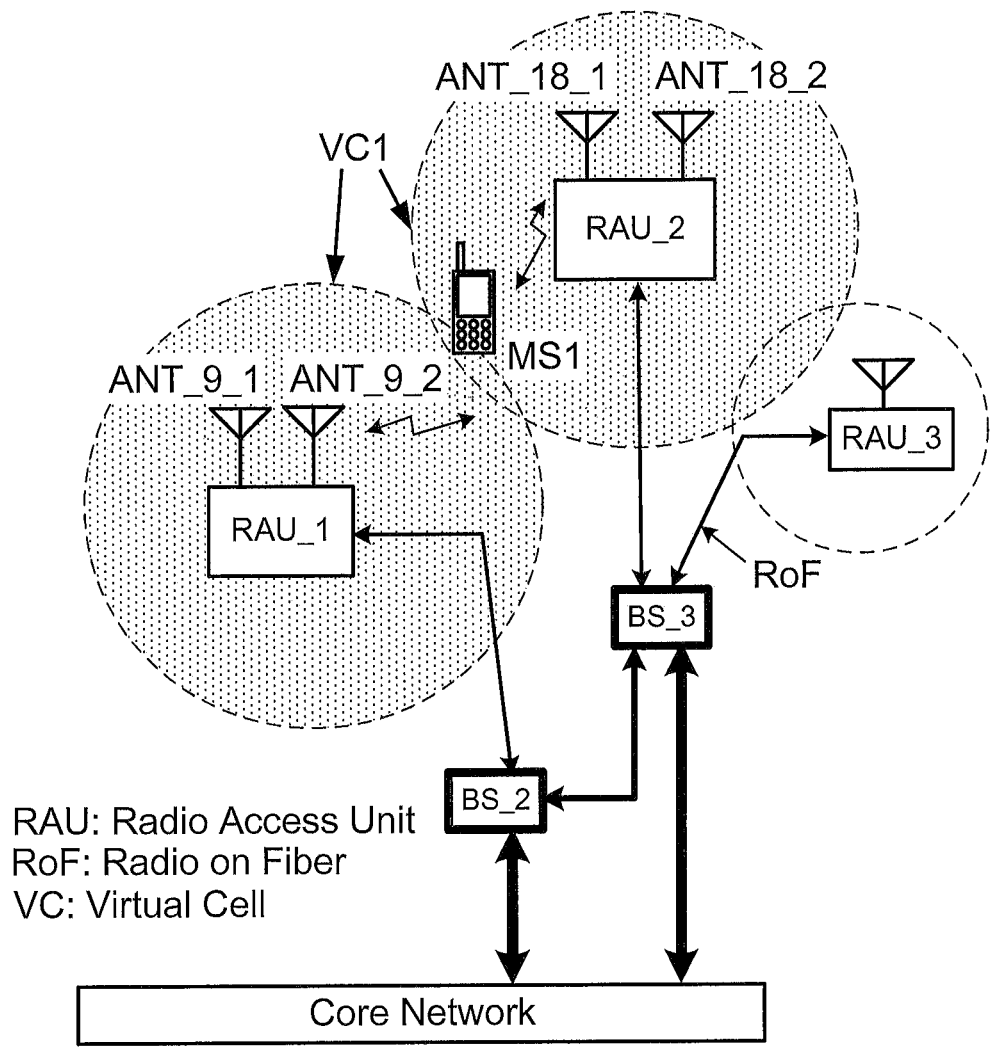
FIG. 20 is a diagram illustrating a configuration where a single RAU uses a plurality of antennas.

As in Embodiment 4, when each RAU has different maximum transmit power of the RAU, the correction can be made to each cross-correlation value using the maximum transmit power information of the RAU included in physical number PH_w detected in step T2. Further, since this Embodiment does not use a PiCH, it is possible to support a configuration where a single RAU uses a plurality of antennas as shown in FIG. 20. It is possible to identify a group number g for antenna number ANT_g_h (group number g=1, 2, 3, . . . , G, Port number h=1, 2, 3, . . . , H).

The invention claimed is:

1. A base station apparatus that is applied to a wireless communications system and that is configured to connect at least two radio access unit apparatuses which respectively include at least one antenna and at least one signal conversion apparatus for performing radio communications with mobile station apparatuses, the base station apparatus comprising:
   a control signal generating circuit configured to generate at least two different first pilot signals for the radio access unit apparatuses belonging to the base station apparatus and a second pilot signal common to all of the radio access unit apparatuses belonging to the base station apparatus, and generate baseband signals including any one of the first pilot signals and the second pilot signal respectively for the respective radio access unit apparatuses; and
   a transmitting circuit configured to transmit the baseband signals respectively to the respective radio access unit apparatuses.

2. The base station apparatus according to claim 1, wherein the control signal generating circuit configured to time-multiplex, frequency-multiplex, or code-multiplex the first pilot signals and the second pilot signal among the at least one radio access unit apparatuses, and thereby generate the baseband signals.

3. The base station apparatus according to claim 1, wherein the control signal generating circuit configured to associate a base station apparatus number with a code number of a second synchronization signal part, of first and second synchronization signal parts generated for a synchronization signal.

4. The base station apparatus according to claim 1, wherein the control signal generating circuit configured to associate a radio access unit apparatus number with a code number of a first synchronization signal part, of first and second synchronization signal parts generated for a synchronization signal.

5. The base station apparatus according to claim 3, wherein the control signal generating circuit configured to associate a radio access unit apparatus number with a code number of a first synchronization signal part, of first and second synchronization signal parts generated for a synchronization signal.

6. A mobile station apparatus that is applied to a wireless communications system and that is configured to perform radio communications with at least one radio access unit apparatus that connects a base station apparatus and includes at least one antenna and at least one signal conversion apparatus for performing radio communications with mobile station apparatuses, the mobile station apparatus comprising:

a receiving circuit configured to receive at least one radio signal transmitted from the radio access unit apparatus, wherein the radio signal transmitted from the radio access unit apparatus includes a first pilot signal and a second pilot signal, and the first pilot signal is different from another first pilot signal transmitted from another radio access unit apparatus and the second pilot signal is common to the radio access unit apparatus and said another radio access unit apparatus; and a control signal extracting circuit configured to extract the first pilot signal and the second pilot signal transmitted from the radio access unit apparatus;

a channel quality indicator measuring circuit configured to measure a channel quality indicator depending on the first pilot signal and the second pilot signal transmitted from the radio access unit apparatus; and a transmitting circuit configured to transmit the channel quality indicator to the base station apparatus through the radio access unit apparatus or through said another radio access unit apparatus.

7. A radio communications system comprising:

at least two radio access unit apparatuses, wherein either one of the two radio access unit apparatuses includes at least one of antenna configured to transmit a radio signal including a first pilot signal and a second pilot signal to a mobile station apparatus, and at least one of signal conversion apparatus configured to perform radio communications with at least one base station apparatus;

the other one of the two radio access unit apparatuses includes at least one antenna configured to transmit a radio signal including a first pilot signal that is different from the first pilot signal transmitted from the one of the two radio access unit apparatuses and the second pilot signal that is common to both of the two radio access unit apparatuses, and at least one signal conversion apparatus configured to perform communications with at least one base station apparatus; and a base station apparatus configured to communicate with at least two radio access unit apparatuses, the base station including:

a control signal generating circuit configured to generate baseband signals respectively for the respective radio access unit apparatuses; and a transmitting circuit configured to transmit the baseband signals respectively to the respective radio access unit apparatuses.

8. A baseband signal generation method applied to a base station, the baseband signal generation method comprising:

generating at least two different first pilot signals for the radio access unit apparatuses which includes at least one of antenna and at least one of signal conversion apparatus and belonging to a base station apparatus, and a second pilot signal common to all the radio access unit apparatuses belonging to the base station apparatus, the respective radio access unit apparatuses configured to perform radio communications with mobile station apparatuses;

generating baseband signals including any one of the first pilot signals and the second pilot signal respectively for the respective radio access unit apparatuses; and transmitting the baseband signals respectively to the respective radio access unit apparatuses.

9. The baseband signal generation method applied to a base station according to claim 8, wherein the method time-multiplexes, frequency-multiplexes, or code-multiplexes the first pilot signals and the second pilot signal among the radio access unit apparatuses.

10. An antenna selection method in a mobile station apparatus that is applied to a wireless communications system and that performs radio communications with a radio access unit apparatus, the antenna selection method comprising:

receiving a radio signal transmitted from the radio access unit apparatus;

extracting a synchronization channel and a baseband signal from the received radio signal;

detecting a base station apparatus number from a code number of a second synchronization signal part in the extracted synchronization signal;

detecting a number of the radio access unit apparatus from a code number of a first pilot signal in the extracted baseband signal, or of a first synchronization signal part in the extracted synchronization signal; and identifying an antenna number of the radio access unit apparatus based on the detected radio access unit apparatus number and the detected base station apparatus number.

* * * * *